United States Patent [19]

Chang et al.

[11] Patent Number: 4,768,150

[45] Date of Patent: Aug. 30, 1988

[54] APPLICATION PROGRAM INTERFACE TO NETWORKING FUNCTIONS

[75] Inventors: Chij-Mehn Chang, Austin, Tex.; Thomas J. Freund, Winchester, England; Larry K. Loucks, Austin; Robert L. Wierwille, Leander, both of Tex.

[73] Assignee: International Business Machines Corporation, Armonk, N.Y.

[21] Appl. No.: 908,533

[22] Filed: Sep. 17, 1986

[51] Int. Cl.$^4$ .............................................. G06F 1/00
[52] U.S. Cl. .................................................. 364/300
[58] Field of Search ........................ 364/200, 300, 900

[56] References Cited

U.S. PATENT DOCUMENTS 4,672,570  6/1987  Benken ................................ 364/900

OTHER PUBLICATIONS

An Introduction to Advanced Program-To-Program Communication, Jul. 1983, GG24-1584-0, IBM.
IBM RTPC SNA Access Method, Aug. 1986.
"Using System/36 Communications", IBM Corporation, Order No. SC21-9082; pp. 9-1 to 9-22, pp. 10-1 to 10-4, pp. F1-10.
"Interactive Communications Feature: Base Subsystems Reference", IBM Corporation, Order No. SC21-9530; pp. 1-28 to 1-38, pp. 4-17 to 4-40, pp. B-1 to B-8.
VTAM Programming, IBM Corporation, Order No. SC23-0115; pp. 3-32, 39-76, 77-152.
DECnet/SNA VMS APPC/LU6.2 Programming Interface Guide, Digital Equipment Corporaion, Jun. 1985, Order No. AA-ET91A-TE.
IBM RT PC SNA Access Method Guide and Reference, IBM Corporation.

Primary Examiner—Raulfe B. Zache
Attorney, Agent, or Firm—Marilyn D. Smith

[57] ABSTRACT

A system for, and method of, providing an interface to an application program for accessing networking functions. The application program interface translates routines requesting networking functions to the operating system commands which contain facilities for accessing networking functions. In addition, the application program interface externalizes the operating system commands for use by the application program in accessing networking functions.

34 Claims, 20 Drawing Sheets

APPLICATION PROGRAM INTERFACE TO NETWORKING FUNCTIONS

CROSS-REFERENCES TO RELATED APPLICATIONS

Ser. No. 908,534, filed Sept. 17, 1986 for a A METHOD AND SYSTEM FOR AN APPLICATION PROGRAM TO COMMUNICATE THROUGH A NETWORK PROTOCOL, currently copending, and assigned to the same assignee as the present invention.

FIELD OF THE INVENTION

This invention relates to processing systems connected through networking, and more particularly to a processing system running an application program having access to networking functions.

BACKGROUND ART

FIG. 1 shows the layers of a typical processing system 1. The application program 9 runs on the operating system 10. All of the commands of the operating system 10 that go to the devices 4 must go through the virtual resource manager 8 which includes the device drivers 13. In order for a processing system 1 to communicate to other remote processing systems or other devices 2, the processing system must have an architecture 5 that defines the information flow through the network system. A typical network architecture 5 comprises a total description of the logical structure, formats, protocols, and operational sequences for transmitting information through the communication system.

A typical network architecture 5 is called Systems Network Architecture (SNA). Systems Network Architecture (SNA) is a specification that formally defines the functional responsibilities for components of a data communications system, and specifies how those components must interact. In an SNA structure, all nodes, or linked elements follow these definitions.

Systems Network Architecture has two components that control the operation of the local node in the network. One is the physical unit 7, the other is the logical unit 6. Each one of these components has a special assigned function in the network. Also, each of these components can be separately addressed by other members of the network.

The physical unit 7 controls the physical resources of the node. Physical resources include the data links 14 that connect the node to the network, storage, and input/output devices 4. All nodes in the network must have a physical unit.

The logical unit 6 provides the interface to the network for the end user. It provides protocols that allow end users to communicate with each other and with other components in the network. A logical unit (LU) is classified according to the protocol that it implements. For example, the SNA protocol consists of unique environments for LU types 1,2,3, and 6.2.

Logical Units 1, 2, and 3 (LU1, LU2, LU3) communicate with a host in a primary-to-secondary relationship. The host computer, as the primary node, controls the data interchange between the two nodes. Specifically, the LU 1 protocol manages the input/output devices associated with the logical unit such as printers, card readers, storage devices, and operator consoles. The LU 2 protocol describes the protocol of an IBM 3270 data terminal connected to the host. It provides keyboard input and display output. The LU 3 protocol describes the protocol of a printer connected to the host. It provides printed output. The LU 6.2 protocol provides advanced program to program communications (APPC) for communications between two programs on a peer-to-peer basis instead of in a primary-to-secondary relationship. More information about this protocol is found in *IBM International Systems Centers An Introduction To Advanced Program-To-Program Communication (APPC)* #GG24-1584-0, July 1983 which is herein incorporated by reference.

A link session describes the physical hardware and supporting programs that allow a system to attach to a particular communications link 14. The link session includes the remote node 2, but only describes the physical environment of the nodes. For example, a link session may be an adapter for hardware 4, cabling, and Synchronous Data Link Control (SDLC) software that enables a system to attach to a SDLC network.

An SNA session defines the network path that links two logical units 6 in different nodes together to enable them to establish communications. An SNA session includes network addressing, the name of the remote program, and other descriptive information.

A conversation is a pathway between two application programs that allows them to transfer information to each other. Two types of SNA conversations are a basic conversation and a mapped conversation.

A basic conversation is a connection between two transaction programs that allows them to exchange logical records. This conversation type is used by service transaction programs and LU1, 2, and 3 application transaction programs.

A mapped conversation is a connection between two transaction programs that allows them to exchange data records of any length and in any format specified by the transaction programs. This conversation type is used for LU 6.2 conversations only and is used primarily for application transaction programs.

An application program interface (API) 3 is a mechanism by which a communications application program 9 acquires use of the network protocol 5. The application program interface 3 is typically quite complex and contains details of the network protocol. In order to write extremely efficient application programs that provide high level networking services to a general class of user, the programmer requires direct interaction with, and intimate knowledge of the network protocols. Furthermore, if the network protocols change, the application program must be rewritten to adjust to the changes.

Deficient in the above is an interface to an application program for accessing networking functions. With the invention of this application is provided an application program interface which translates routines requesting networking functions to the operating system commands which in turn contain facilities for accessing networking functions. The interface further externalizes the operating system commands for use by the application program in accessing networking functions.

SUMMARY OF THE INVENTION

It is therefor an object of this invention to give an application program direct interaction with a network environment without requiring intimate knowledge of the network protocols.

It is a further object of this invention to isolate changes in a network configuration from an application program.

In furtherance of the objects of this invention an application program interface maps a set of subroutines to a corresponding set of operating system call functions. The application program interface comprises services that map specific requests for communication functions onto facilities provided by the operating system's commands. The system of this invention furthermore externalizes the operating system calls as an application program interface.

The application program interface of this invention allows transaction programs to establish a connection with one or more remote transaction programs, exchange data with that program, and to disconnect from the remote transaction program.

The interface comprises routines that are translated by an application program interface service to corresponding operating system calls. A first routine initializes a connection to a remote node. A second routine creates a conversation between the local transaction program and a transaction program at a remote node. To begin a data exchange with a remote program, a third routine is used to get data from a remote program, and a fourth routine is used to send data to the remote program. A fifth routine is used to monitor and control the conversation. A sixth routine dissolves the conversation between two transaction programs. A seventh routine ends the connection.

The system and method of this invention also allows an application transaction program access to the Systems Network Architecture through the application's use of the operating system calls. The AIX[1] operating system calls comprise OPEN, CLOSE, READ, WRITE, IOCTL, READX, WRITEX. The OPEN command opens a resource. The READ and READX commands receive data from a remote transaction program. The WRITE and WRITEX commands sends data to a remote transaction program. The IOCTL command controls the data transfer between local and remote transaction programs. The CLOSE command closes a connection.

*[1] AIX is a trademark of International Business Machines Corporation.

Both the routines and system commands comprise specific parameters that enable the routines and commands to perform the corresponding network function. The commands and routines typically comprise a parameter that identifies the connection through a connection ID, a parameter that identifies a network function request, and a parameter that points to a specific structure in memory.

BRIEF DESCRIPTION OF THE DRAWING

FIG. 19 shows a subroutine and command for sending data to a remote program,

DESCRIPTION OF THE PREFERRED EMBODIMENT

Figure 1:
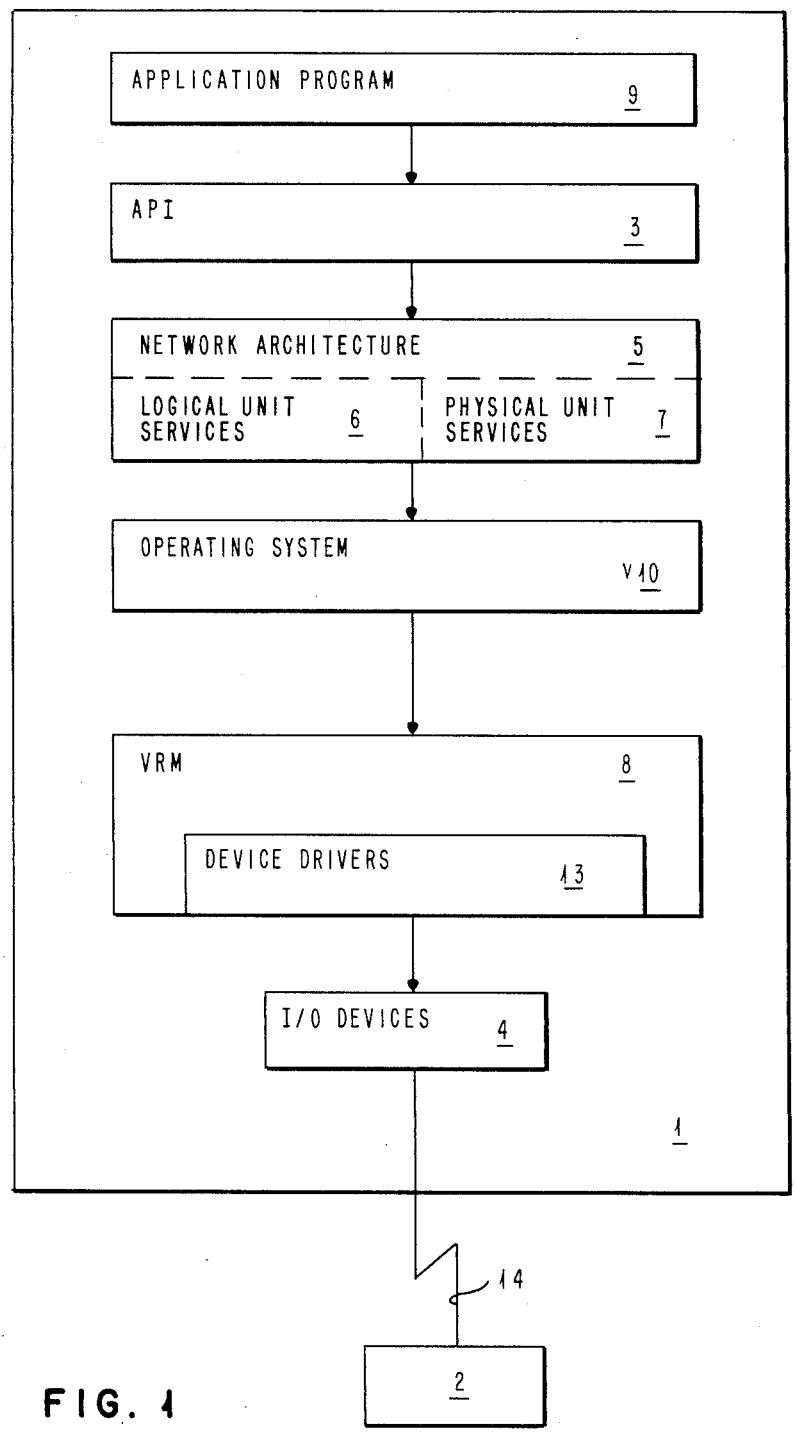
FIG. 1 shows a processing system connected to a network as known in the art.
Figure 2:
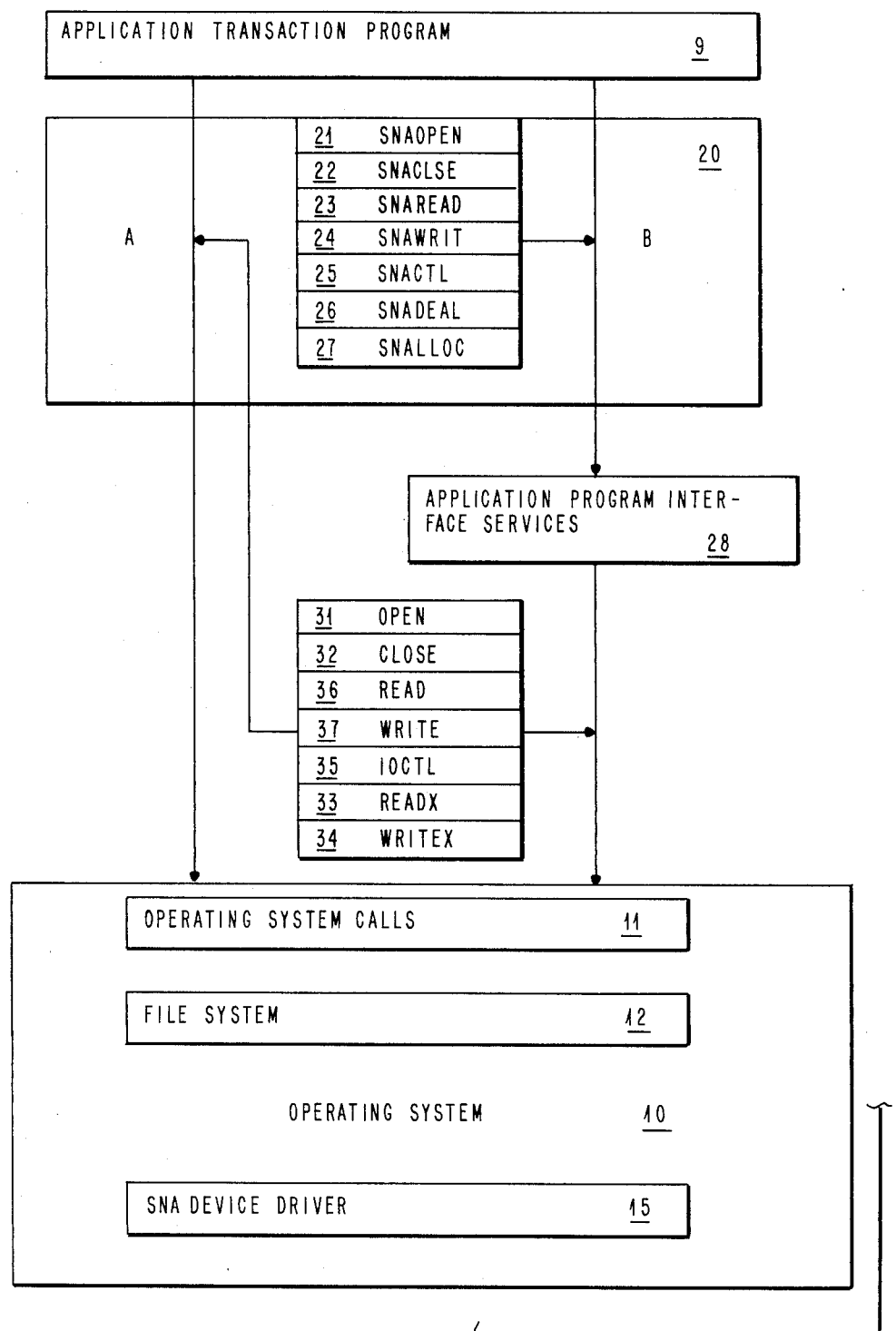
FIG. 2 shows an operating system for use with the interface of this invention.

FIG. 2 illustrates the use of the application program interface 20 of this invention in a processing system 1 having an operating system 10. The operating system 10 has a device driver interface 15 to Systems Network Architecture. The device driver 15 is accessed through the file system 12 of the operating system through the operating system calls 11. Accessing SNA through a device driver 15 within an operating system 10 is further disclosed in the commonly assigned, co-pending U.S. application Ser. No. 908,534, "A Method and System for an Application Program to Communicate Through a Network Protocol", filed Sept. 17, 1986, which is hereby incorporated by reference. However, the application program interface 20 of this invention is applicable to other systems accessing a SNA protocol, also.

The interface 20 of this invention allows an application program 9 to either issue subroutines 21–27 or to issue system call commands 31–37 when accessing a network protocol. If subroutines 21–27 are issued, the application program interface service 28 translates the subroutines 21–27 into one of the corresponding system calls 31–37.

FIG. 4 through FIG. 20 illustrates the commands and routines in an application program interface for accessing networking functions. A general description of the commands, routines, and the corresponding parameters is as follows. A more detailed description of the commands, routines, and the corresponding parameters is found in *IBM RT PC SNA Access Method Guide and Reference* which is herein incorporated by reference. *The IBM RT PC SNA Access Method Guide and Reference* has been published, and is currently available, as *SNA Services Guide and Reference,* IBM Corporation, order number SC23-0814. This manual provides additional information for using the commands, routines, and parameters in the different LU environments, such as LU1, LU2, LU3, and LU6.2.

Figure 3:
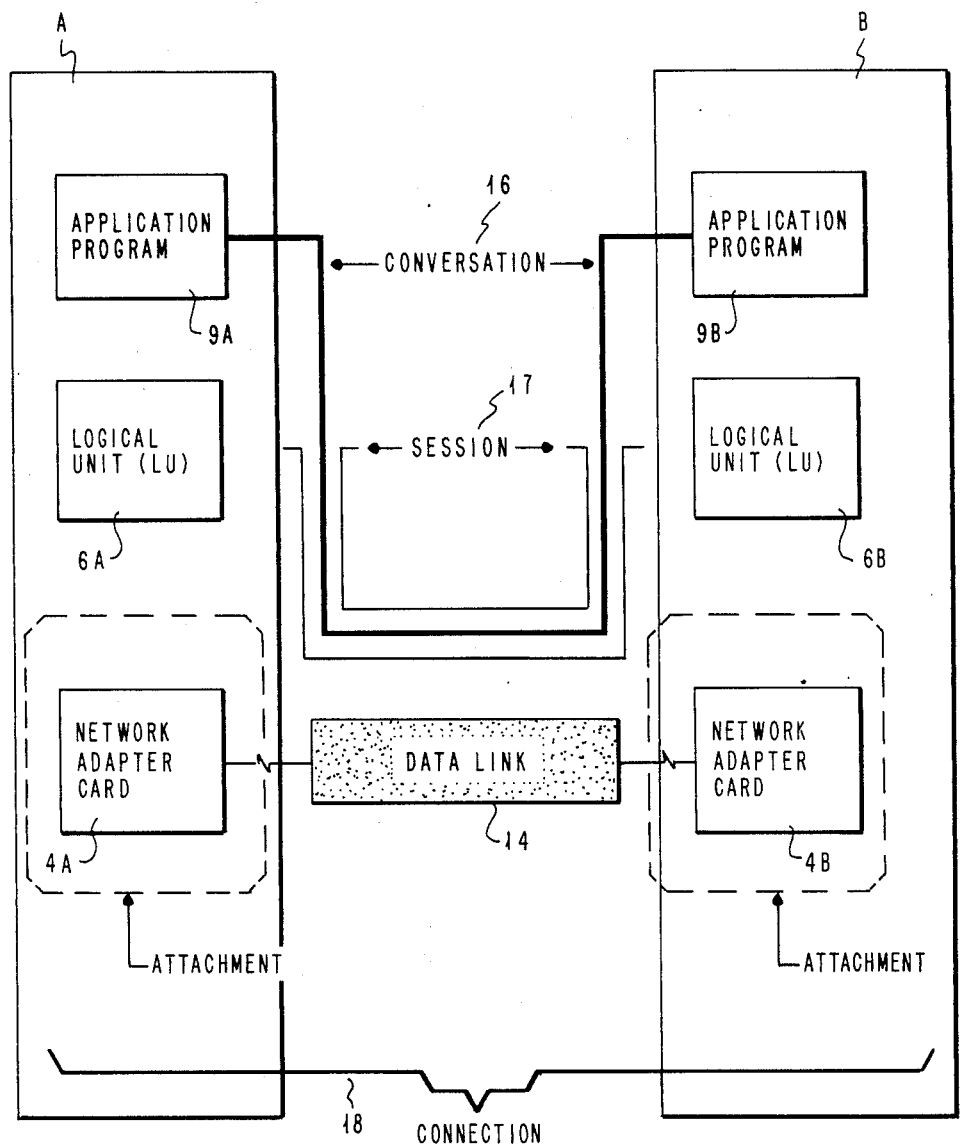
FIG. 3 illustrates a network environment.
Figure 4:
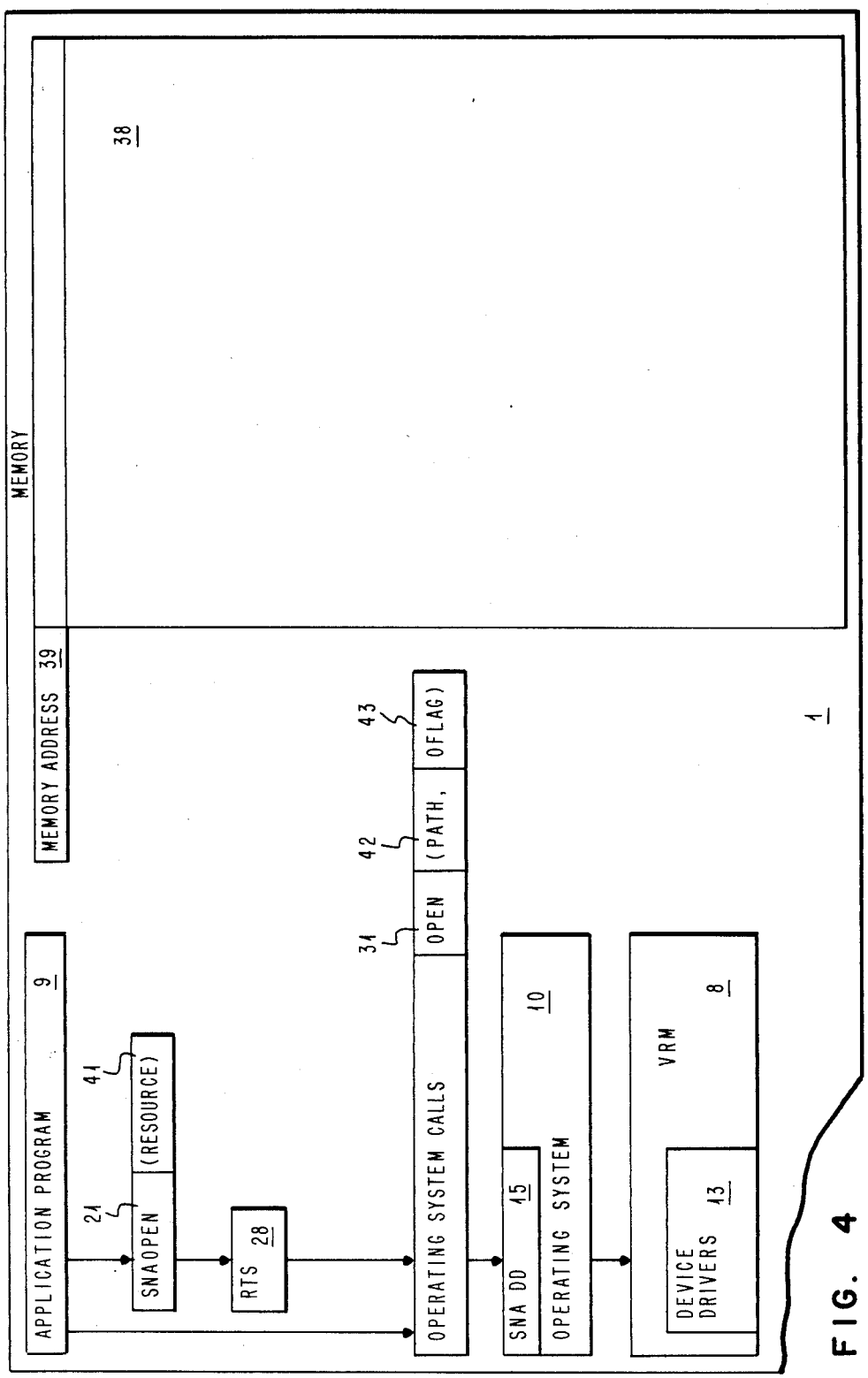
FIG. 4 shows the routine and command for opening a connection.

Referring to FIG. 3 and FIG. 4, to open a connection 18 (FIG. 3) between a local transaction program 9A (FIG. 3) and a remote transaction program 9B (FIG. 3) the application 9 issues either a subroutine referred to as "snaopen" 21, or the system call command OPEN 31. If the subroutine 21 is issued, runtime services (RTS) 28 translates the subroutine 21 to the OPEN command 31. The "snaopen" subroutine 21 includes a resource parameter 41 that specifies a connection profile name of the resource to be opened. The OPEN command 31 includes a "path" parameter 42 and an "oflag" parameter 43. The "path" parameter 42 also specifies the resource to be opened by specifying the SNA device driver name to be used to open the resource, and by specifying the connection profile name of the resource to be opened. If the "snaopen" subroutine completes successfully, it returns an integer that specifies the connection ID (cid) for the connection 18 (FIG. 3). Likewise, if the OPEN command 31 completes successfully, it returns an integer that specifies the file descriptor (fd) for the connection 18 (FIG. 3).

Figure 5:
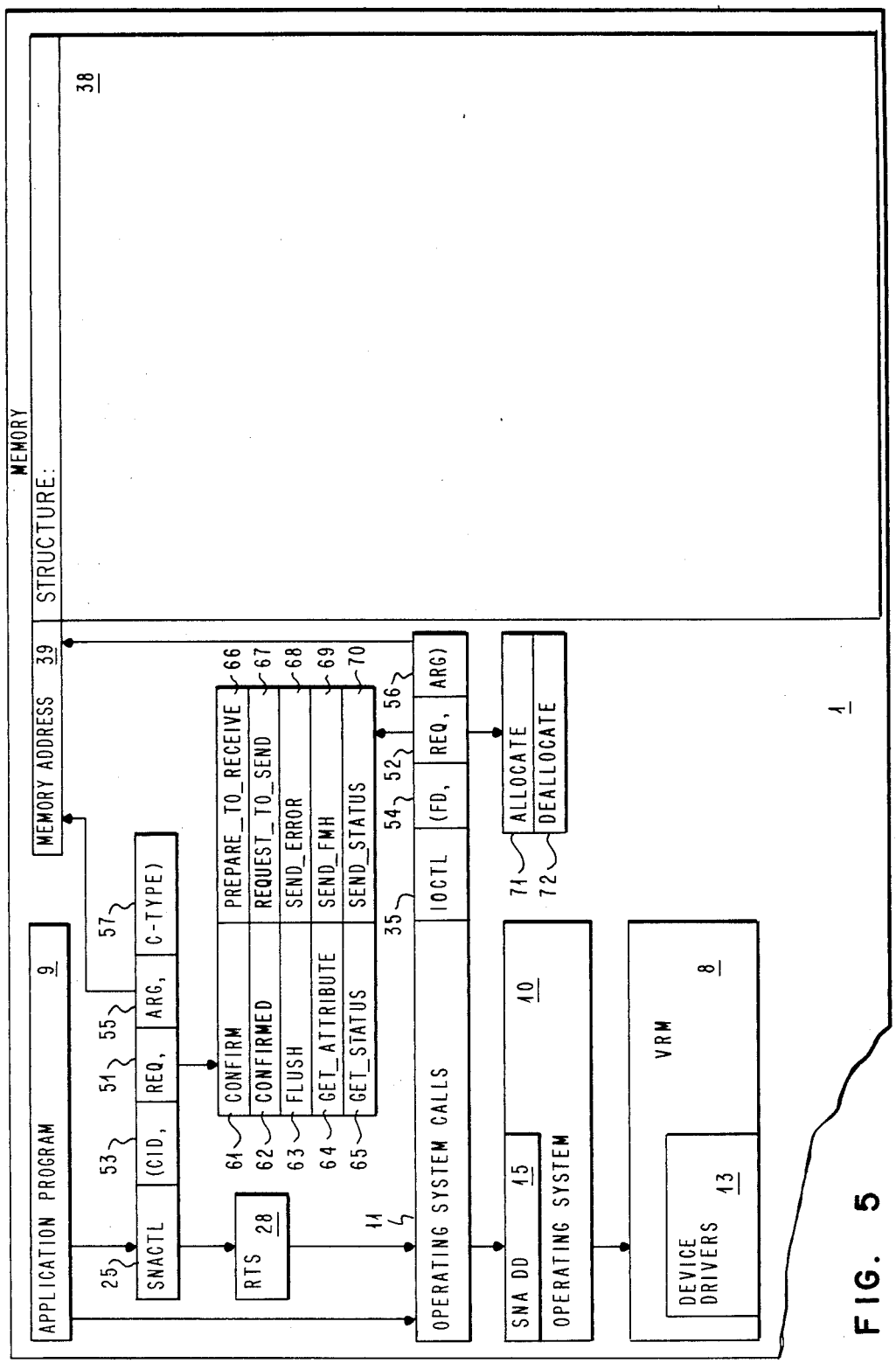
FIG. 5 shows the routine and command for controlling the data transfer between a local and remote transaction program.

With reference to FIG. 5, the "snactl" subroutine 25 and the "ioctl" command 35 provides control functions for transfer operations between a local 9A (FIG. 3) and a remote transaction program (9B). The control function is specified by the request (req) parameter 51, 52 and may be one of the following: CONFIRM 61, CONFIRMED 62, FLUSH 63, GET_ATTRIBUTE 64, GET_STATUS 65, PREPARE_TO_RECEIVE 66, REQUEST_TO_SEND 67, SEND_ERROR 68, SEND·3FMH 69, and SEND_STATUS 70. The "ioctl" command 35 has the additional two requests ALLOCATE 71 and DEALLOCATE 72.

The parameters of the "ioctl" command 35 include "fd" 54, "req" 52, and "arg" 56. The parameter "fd" 54 specifies the variable that contains the file descriptor returned by the OPEN system call 31 as described in co-pending U.S. application Ser. No. 908,534, "A Method and System for an Application Program to Communicate Through a Network Protocol", filed Sept. 17, 1986. The parameter "req" 52 specifies the function to be performed. The "arg" parameter 56 is an integer that can be used to specify either the variable that contains the resource i.d. (rid) returned by the "ioctl" ALLOCATE system call, or a pointer to a structure that contains additional input parameters for the requested function 52.

The parameters of the "snactl" command 25 include "cid" 53, "req" 51 , "arg" 55, "c_type" 57. The "cid" parameter 53 specifies the variable that contains the connection ID returned by the "snaopen" subroutine 21. The parameter "req" 51 specifies the function to be performed. The parameter "arg" 55 specifies the variable that contains one of the following (which depends on the function performed as specified in the request field): the resource ID returned by the snalloc command, or a pointer to a structure that contains additional input parameters for the requested function. The parameter "c_type" 57 specifies a character constant that indicates the conversation type.

Figure 6:
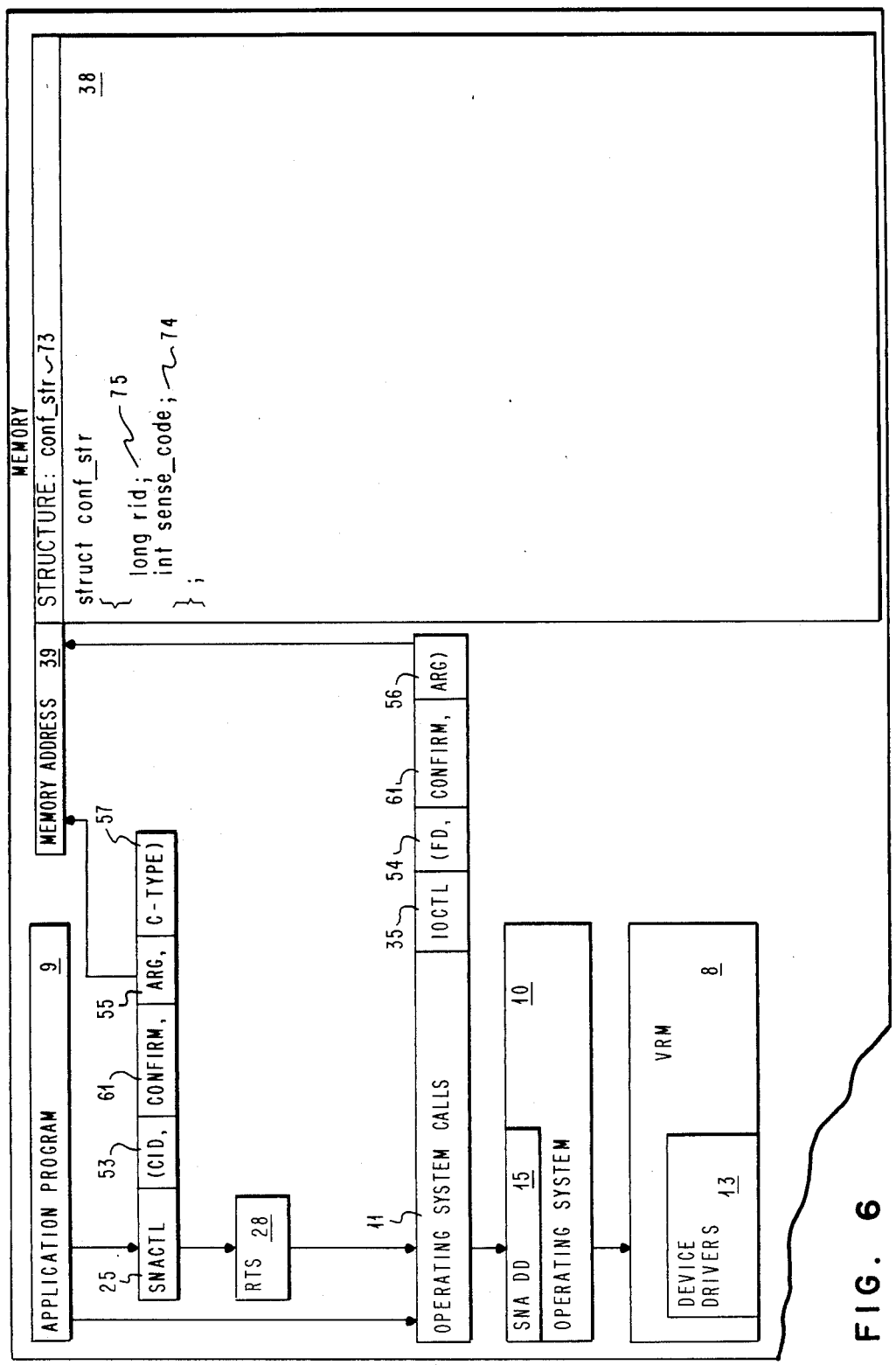
FIG. 6 shows the request function for asking the remote transaction if the last transmission was successfully received.

Referring to FIG. 6, the CONFIRM request parameter 61 on the "snactl" subroutine 25 and the "ioctl" command 35 asks the remote transaction program 9B (FIG. 3) to tell whether the last transmission was successfully received. The remote transaction program 9B (FIG. 3) must respond with one of two requests, CONFIRMED 62 or SEND_ERROR 68.

The CONFIRM request 61 on "snactl" 25 and "ioctl" 35 has the structure of type "conf_str" 73 as shown in memory 38. The "sense_code" parameter 74 specifies a variable that contains the sense code to be reported to the remote session. The "rid" parameter 75 specifies the resource ID.

Figure 7:
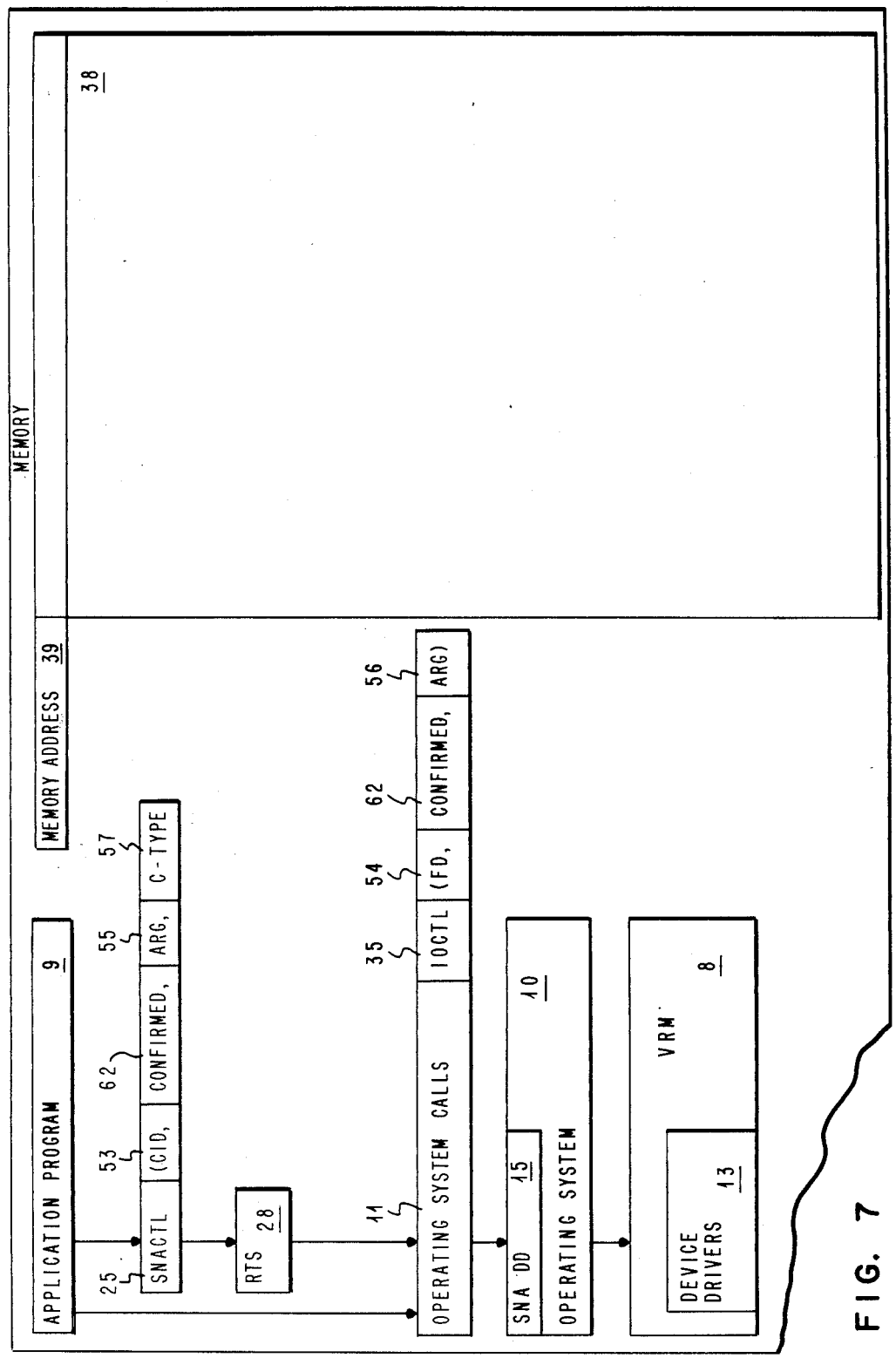
FIG. 7 shows the request function indicating that the remote site received the last transmission without error.

Referring to FIG. 7, the CONFIRMED request 62 is a response to the CONFIRM request 61 (FIG. 6) indicating that the remote site (B FIG. 3) received the transmission without detecting any errors. The parameter "arg" 55, 56 for this request specifies the resource ID for the conversation that was returned by the ALLOCATE request for the conversation.

Figure 8:
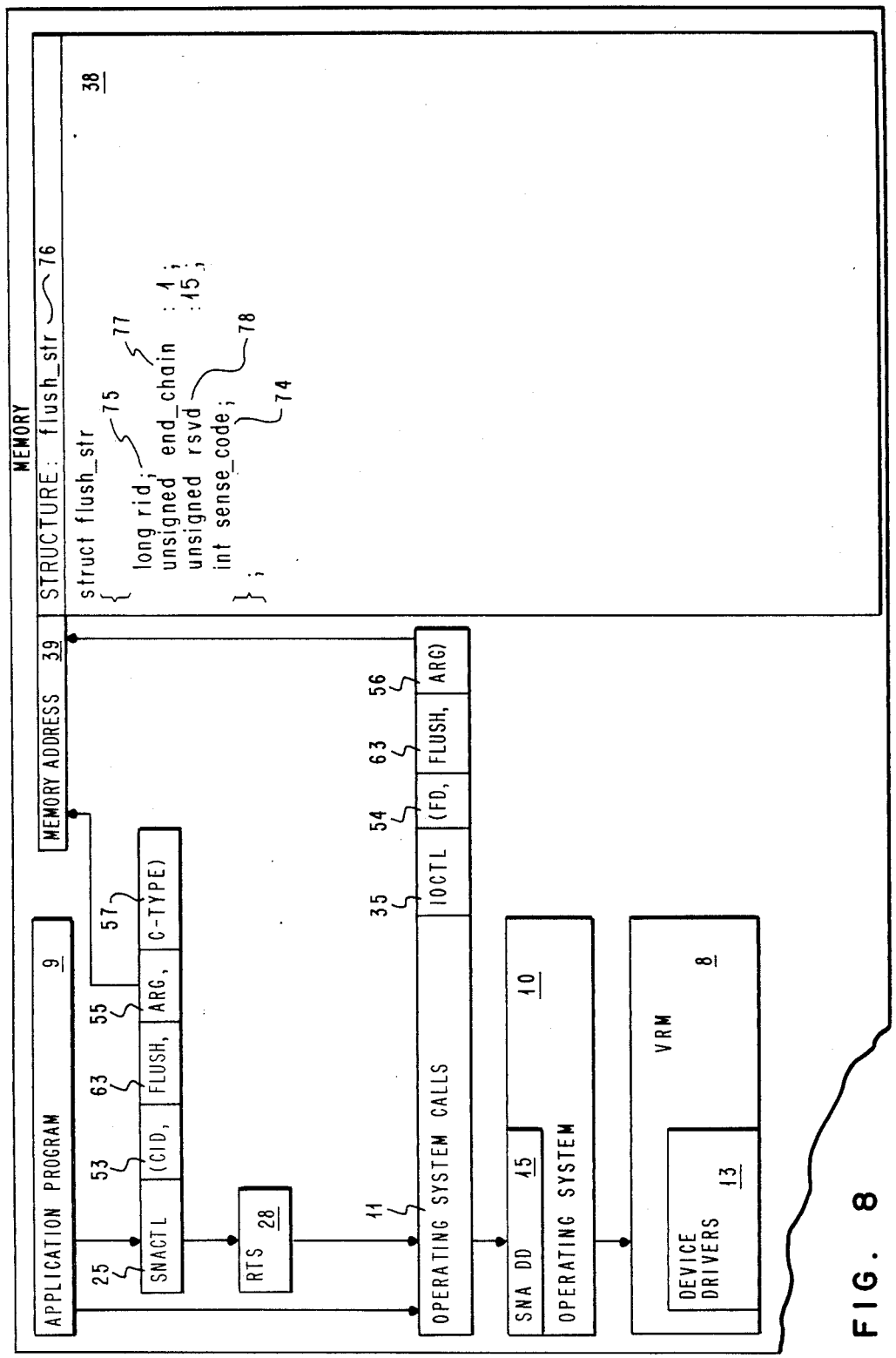
FIG. 8 shows a request function that sends the data in the local LU buffer to the remote LU.

Referring to FIG. 8, the FLUSH request 63 sends any information in the local LU (6A FIG. 3) send buffer to the remote LU (6B FIG. 3). The LU normally buffers the data from "WRITE" calls or "snawrit" commands until it has enough data to transmit. Using this request, the local program 9A (FIG. 3) forces the local LU 6A (FIG. 3) to transmit the data in the buffer. The local program 9A (FIG. 3) can use this request to decrease the delay required to get the data to the remote system (B FIG. 3).

The "arg" parameter 55, 56 points to the structure of type "flush_str" 76 in the memory 38. The "flush_str" structure 76 contains the input parameters for the FLUSH request 63. The "end_chain" parameter 77 specifies whether or not to send the buffer with the end chain indication. The program specifies this parameter as a 1 to complete a chain. To flush the send buffer without completing the chain, the program specifies this parameter as a 0. The "sense_code" parameter 74 specifies a field that receives indications of errors that occurred on previously sent data.

Figure 9:
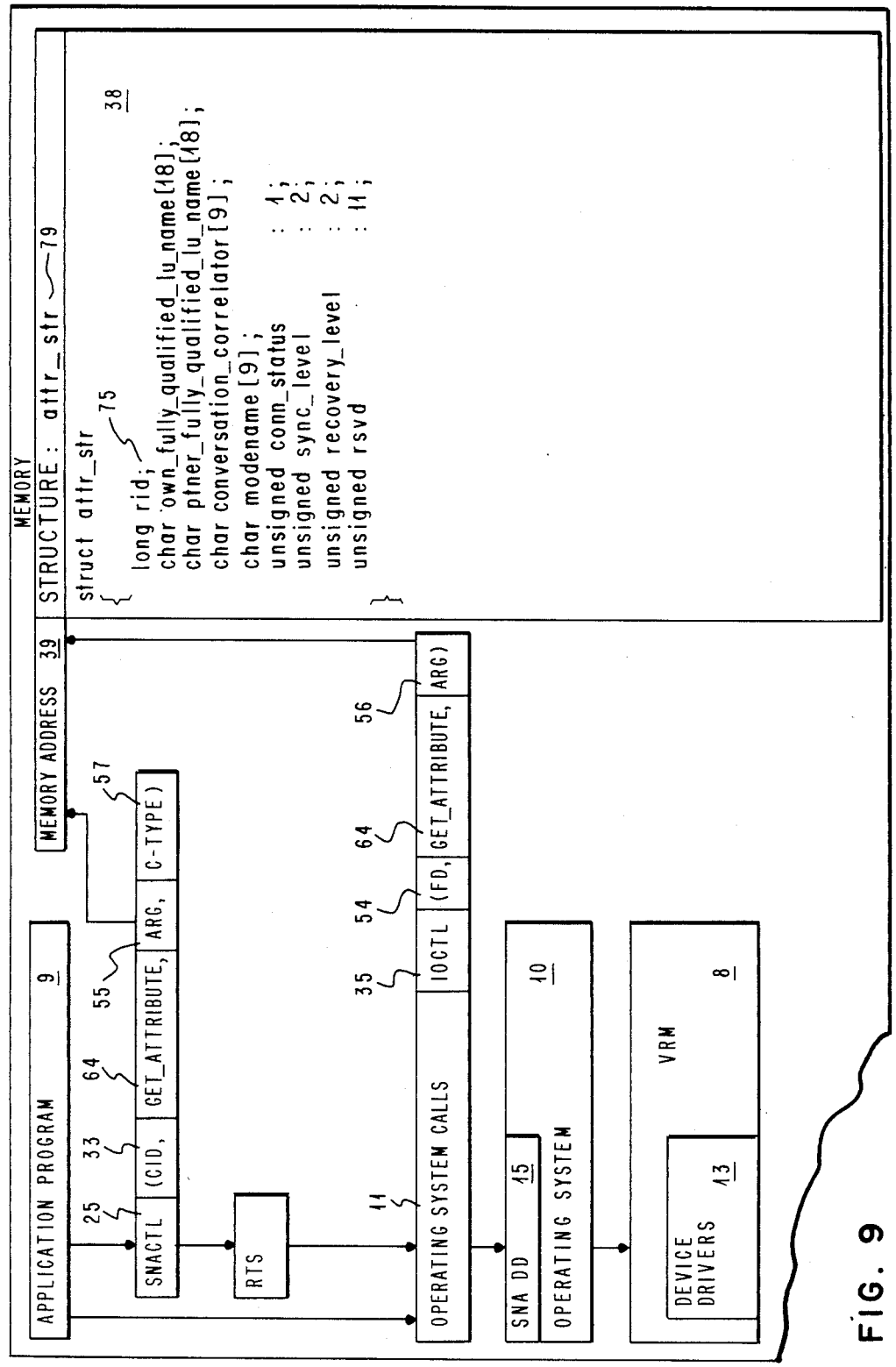
FIG. 9 shows a request function that gets information about a specified conversation.

Referring to FIG. 9 the GET_ATTRIBUTE request 64 gets information about a specified LU6.2 conversation. The parameter "arg" 55, 56 for this request is a pointer to a structure of type "attr_str" 79 which contains the input parameter "rid" 75, and receives the output information from the request. The "attr_str" structure 79 as shown in the memory 38 receives output from the GET_ATTRIBUTE request 64 for the "snactl" subroutine 25 and the "ioctl" commands 35.

Figure 10:
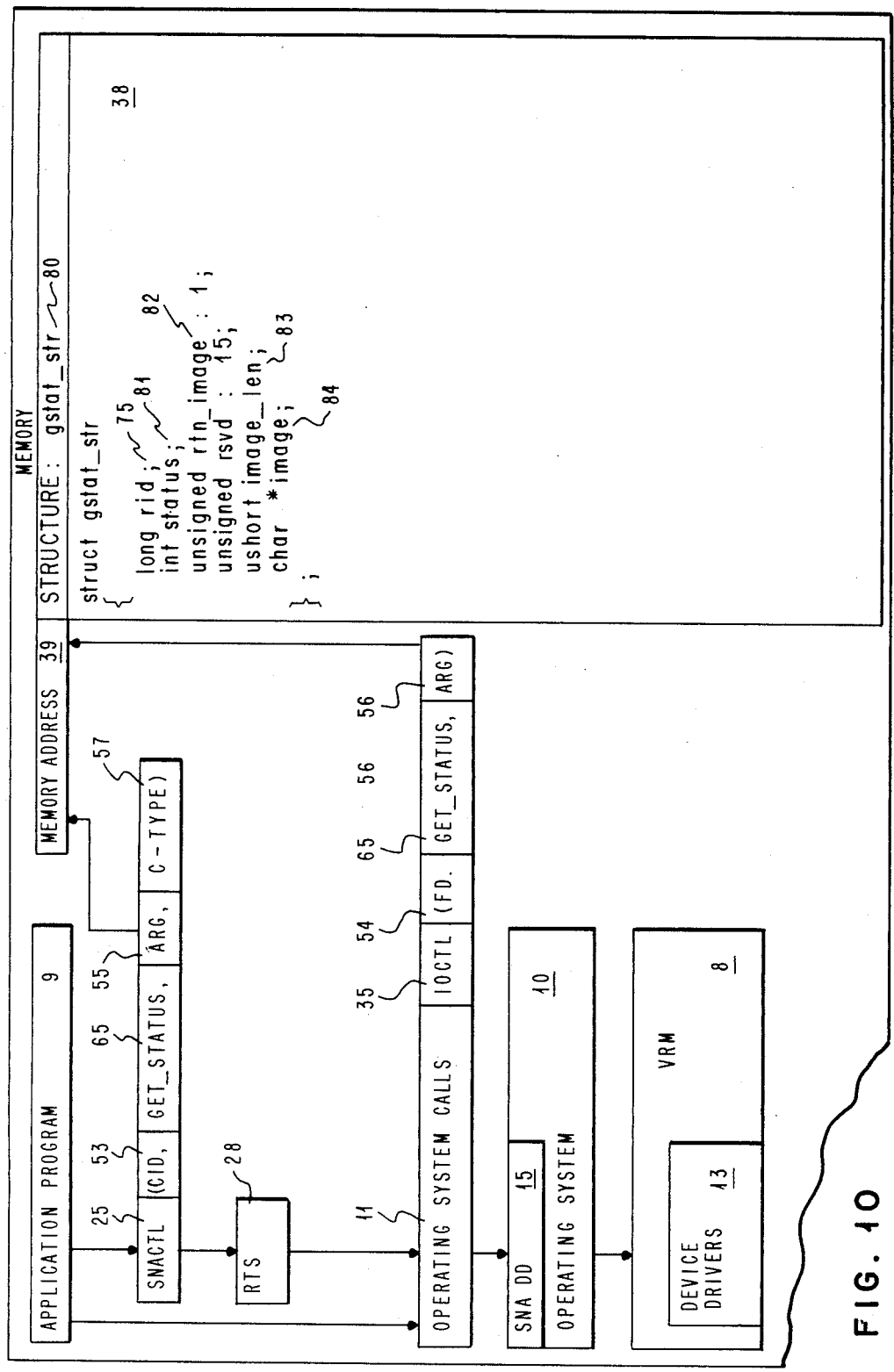
FIG. 10 shows a request function for getting information about a current link and session.

Referring to FIG. 10, the GET_STATUS request 65 gets information about the current link (14 FIG. 3) and session (17 FIG. 3), as well as the unprocessed image from the BIND for the LU-LU session. The parameter "arg" 55, 56 for this request is a pointer to a structure of type "gstat_str" 80 which contains the input parameter "rid" 75, and receives the output status information from the request. The "gstat_str" structure 80 as shown in the memory 38 provides current link information and session information in response to a GET_STATUS request 65. The parameter "status" 81 specifies the current status of the physical and logical link. The parameter "rtn_image" 82 when set indicates that the BIND image associated with the session should be returned in the buffer pointed to by "image_ptr". The "image_len" parameter 83 either contains the maximum amount of BIND image data in bytes that can be returned by the request when the GET_STATUS 65 is issued, or, contains the actual amount of BIND image data in bytes that was returned when the request is complete. The "image" parameter 84 specifies a pointer to the buffer area in which the Bind image data is to be stored.

Figure 11:
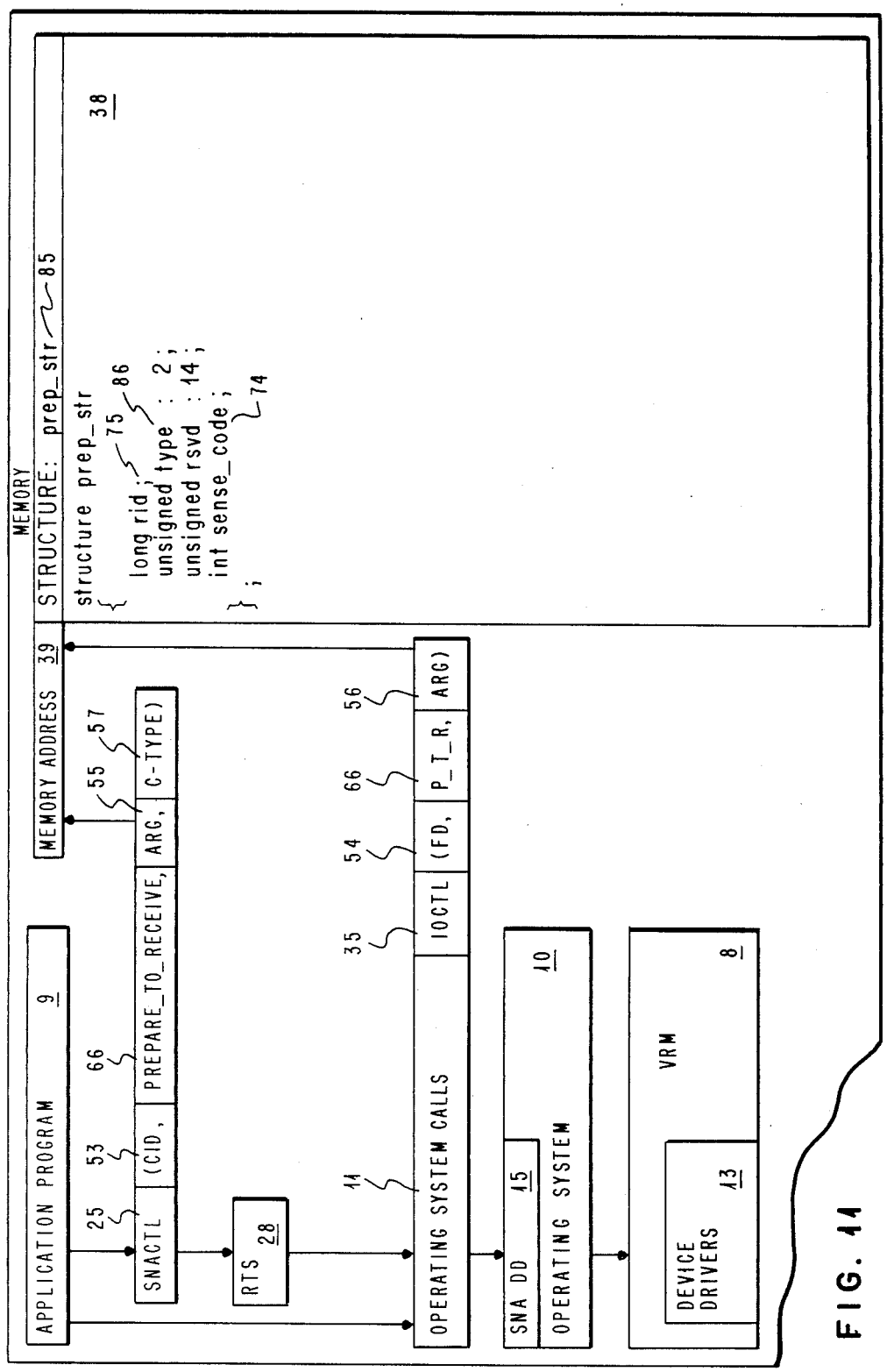
FIG. 11 shows a request function for notifying the remote LU that the local LU needs to change the conversation direction so the local LU can receive from the remote LU.

Referring to FIG. 11, the PREPARE_TO_RECEIVE request 66 notifies the remote LU (6B FIG. 3) that the local LU (6A FIG. 3) has changed the conversation (16 FIG. 3) direction so that the local LU (6A FIG. 3) can begin receiving from the remote LU (6B FIG. 3). The structure "prep_str" 85 provides additional parameters for the PREPARE_TO_RECEIVE request 66. The structure 85 is as shown in memory 38. The parameter "type" 86 specifies the type of request to be performed for this conversation. The "sense_code" parameter 74 specifies a field that receives indications of errors that occurred on previously sent data.

Figure 12:
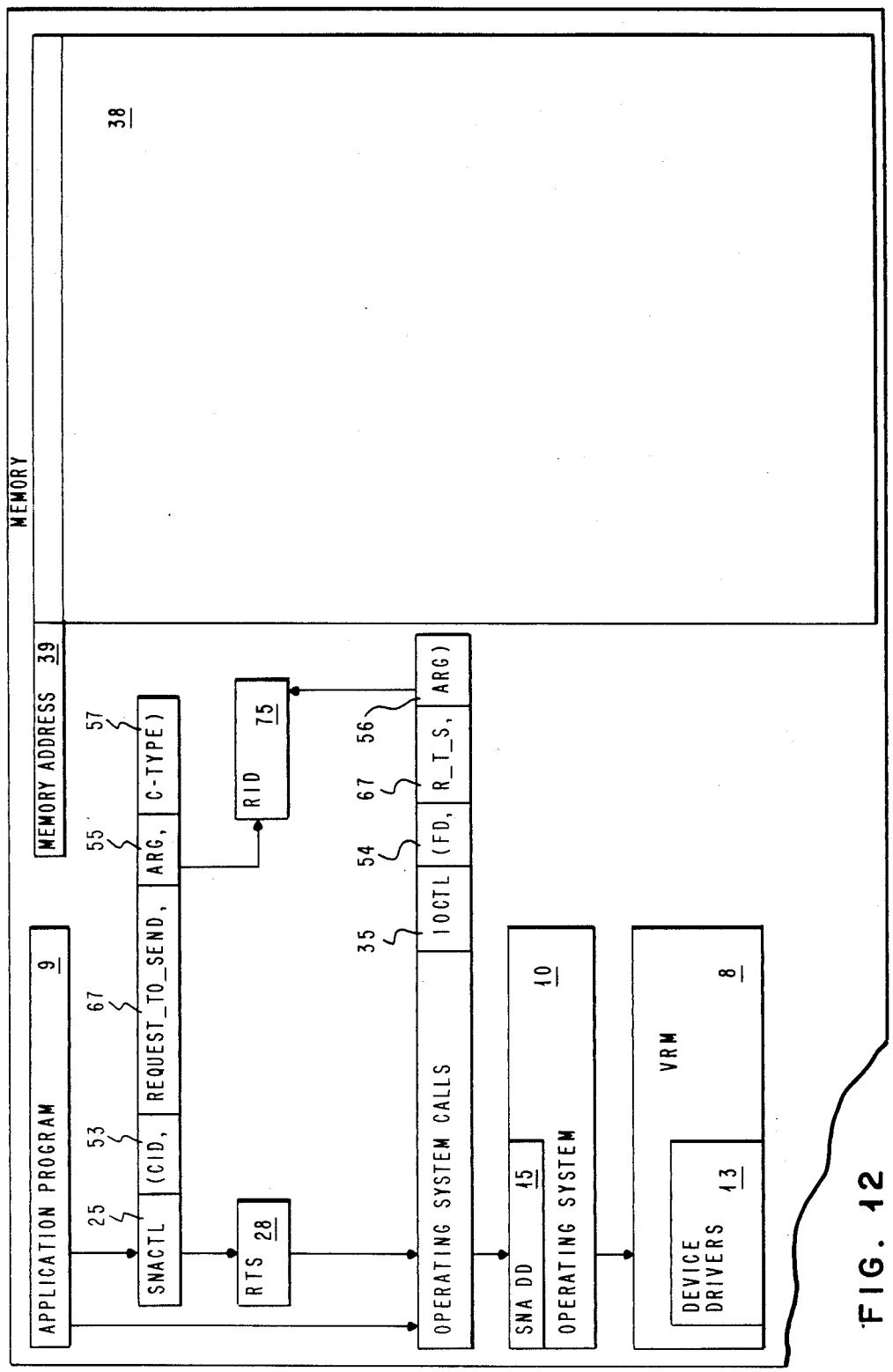
FIG. 12 shows a request function for notifying the remote LU that the local LU needs to change the conversation direction so the local LU can send to the remote LU.

Referring to FIG. 12, the REQUEST_TO_SEND request notifies the remote LU that the local LU needs to change the conversation direction so that the local LU can begin sending to the remote LU. The parameter "arg" specifies the resource ID "rid" 75 for the conversation.

Figure 13:
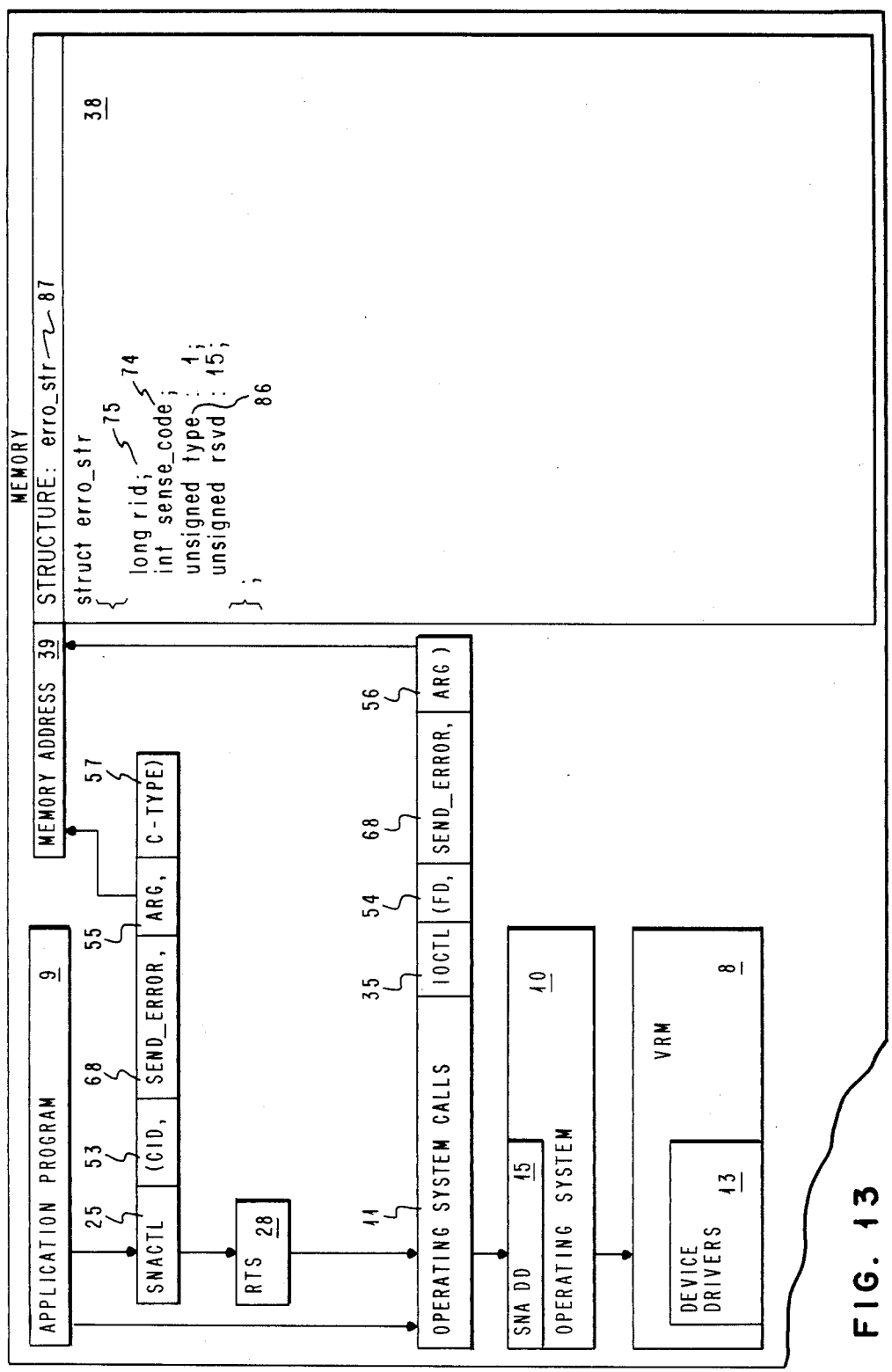
FIG. 13 shows a request function for informing the remote transaction program that the local transaction program has detected an error in the information that it received from the remote program.

Referring to FIG. 13, the SEND_ERROR request 68 informs the remote transaction program (9B FIG. 3) that the local transaction program (9A FIG. 3) has detected an error in the information that it received from, or sent to, the remote program. The parameter "arg" 55, 56 for this request is a pointer to a structure of type "erro_str" 87 which contains the input parameters for the request. The structure for "erro_str" 87 is as shown in the memory 38. The "rid" parameter 75 is the only parameter used for a mapped conversation. For a basic conversation, the parameter "type" 86 specifies the level of error that is being reported as either an application program (9A, 9B FIG. 3) produced the error, or the LU services (6A, 6B FIG. 3) produced the error. Also for a basic conversation, the parameter "sense_code" 74 specifies a variable that contains the sense code to be reported to the remote session.

Figure 14:
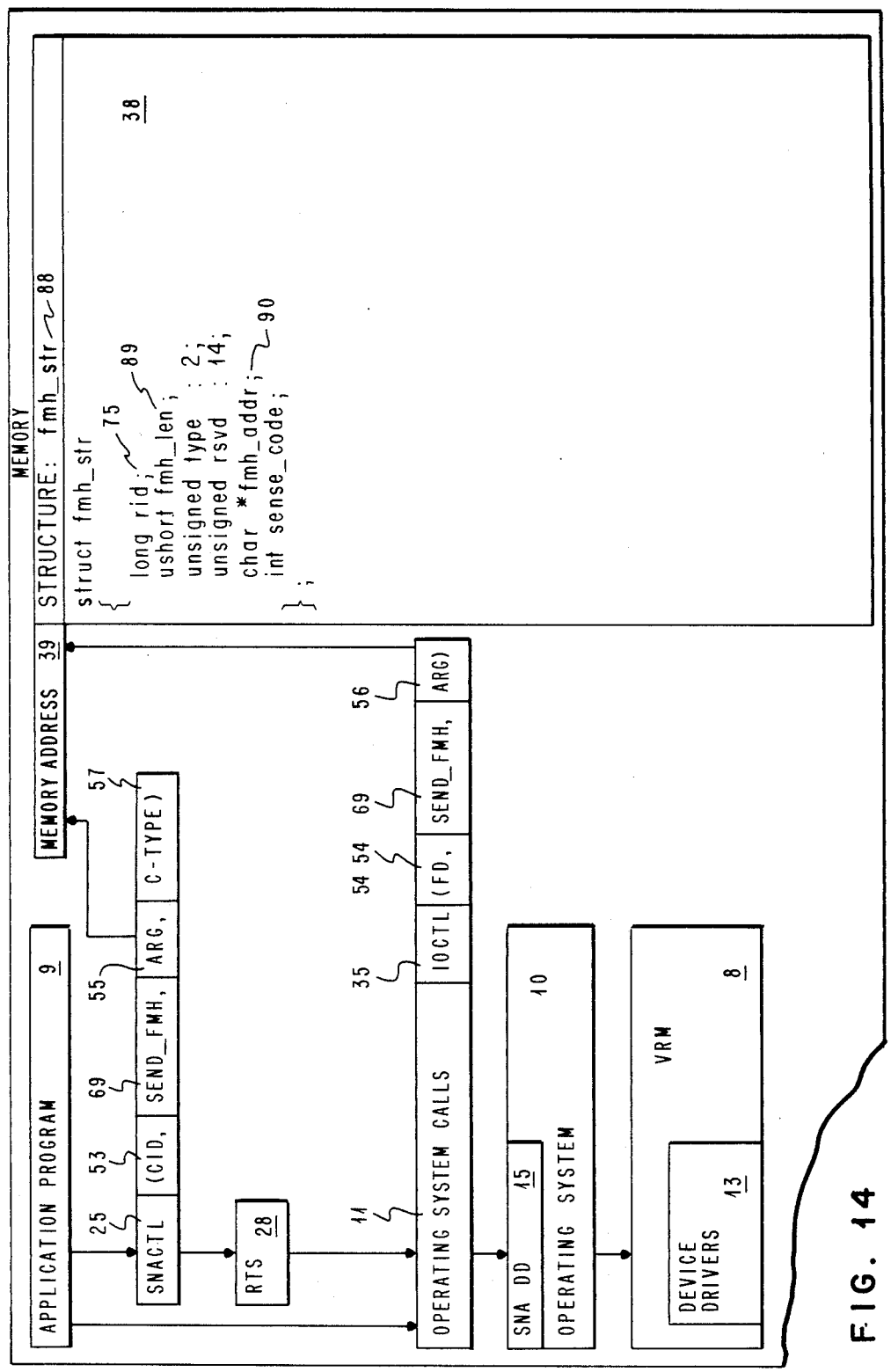
FIG. 14 shows a request function that sends an FM header to the remote LU.

Referring to FIG. 14, the SEND_FMH request 69 sends the FM header to the remote LU (6B FIG. 3). The "arg" parameter 55, 56 is a pointer to a structure of type "fmh_str" 88 which contains the input parameters for the request 69. The structure for "fmh_str" 88 is as shown in the memory 38. The "fmh_len" parameter 89 specifies the length in bytes of the FM header to be sent. The "fmh_addr" parameter 90 specifies a pointer to the address of the FM header to be sent.

Figure 15:
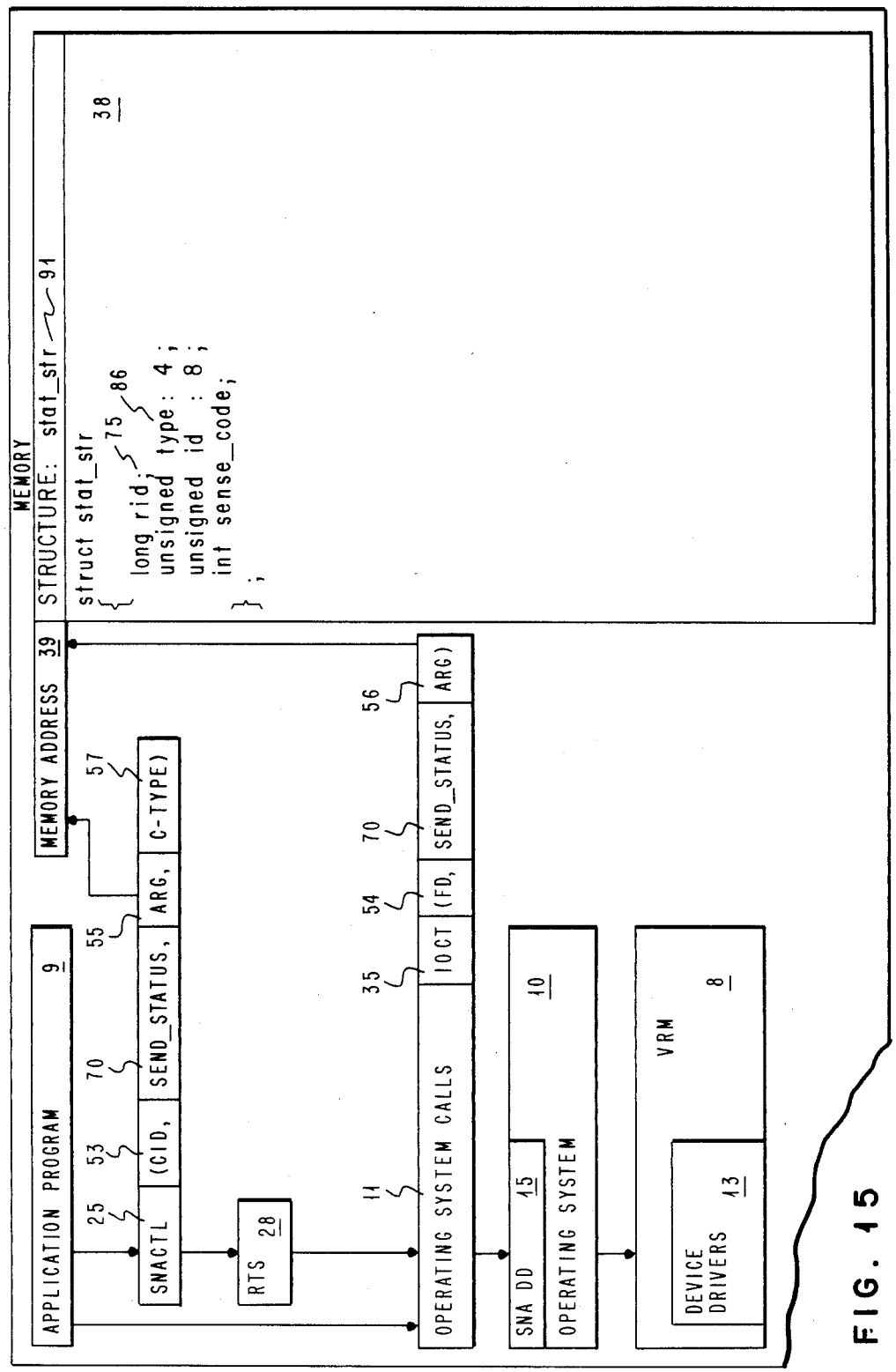
FIG. 15 shows a request function that sends status information about devices on the local session to the host program.

Referring to FIG. 15, the SEND_STATUS request 70 sends status information about the devices on the local session to the host program. The parameter "arg" 55, 56 is a pointer to a structure of type "stat_str" 91 which contains input parameters for the status request. The structure for "stat_str" is as shown in the memory 38. The parameter "rid" 75 specifies the variable that contains the resource ID returned by the "snalloc" subroutine. The parameter "type" 86 specifies the status condition to be reported such as whether the device is on or off, whether the device is configured, and whether or not the device is attended by an operator.

Figure 16:
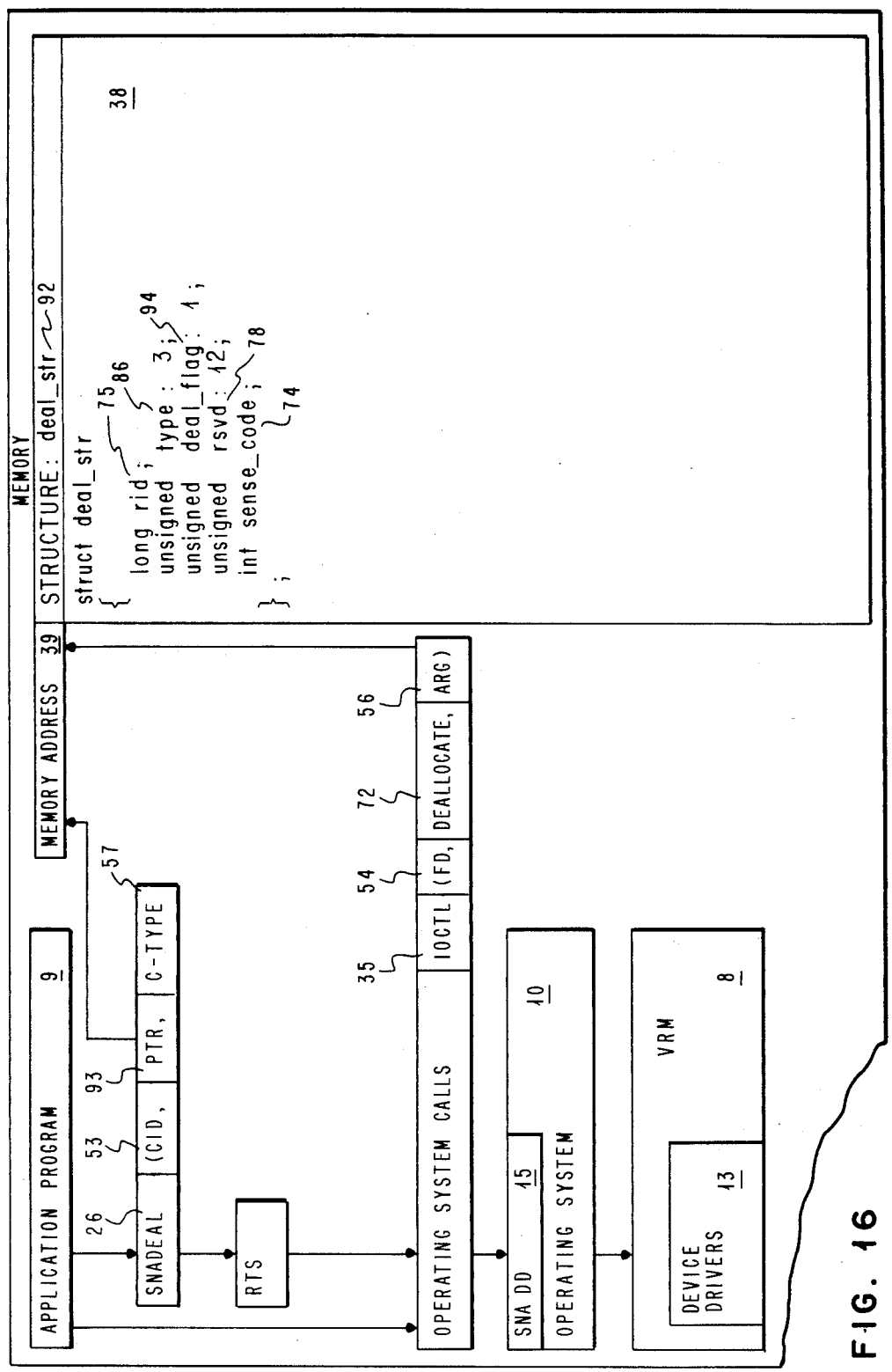
FIG. 16 shows a subroutine and a command for removing the allocation of the specified conversation from the local transaction program.

Referring to FIG. 16, the "snadeal" subroutine and the DEALLOCATE request 72 on the command "ioctl" 35 removes the allocation of the specified conversation (16 FIG. 3) from the local transaction program (9A FIG. 3). Information about the conversation (16 FIG. 3) is supplied in the structure of type "deal_str" which is pointed to by the "ptr" parameter 93 on the "snadeal" subroutine 26, and by the "arg" parameter 56 on the "ioctl" command 35. The parameter "rid" 75 specifies the variable that contains the resource ID of the conversation to be deallocated. The parameter "type" 86 specifies the type of deallocation to be performed for this conversation. The "deal_flag" parameter 94 specifies whether the resource ID is discarded or retained when the conversation is deallocated. The "rsvd" parameter 78 is not used. The "sense_code" parameter 74 specifies a variable that contains the sense code to be reported to the remote session.

Figure 17:
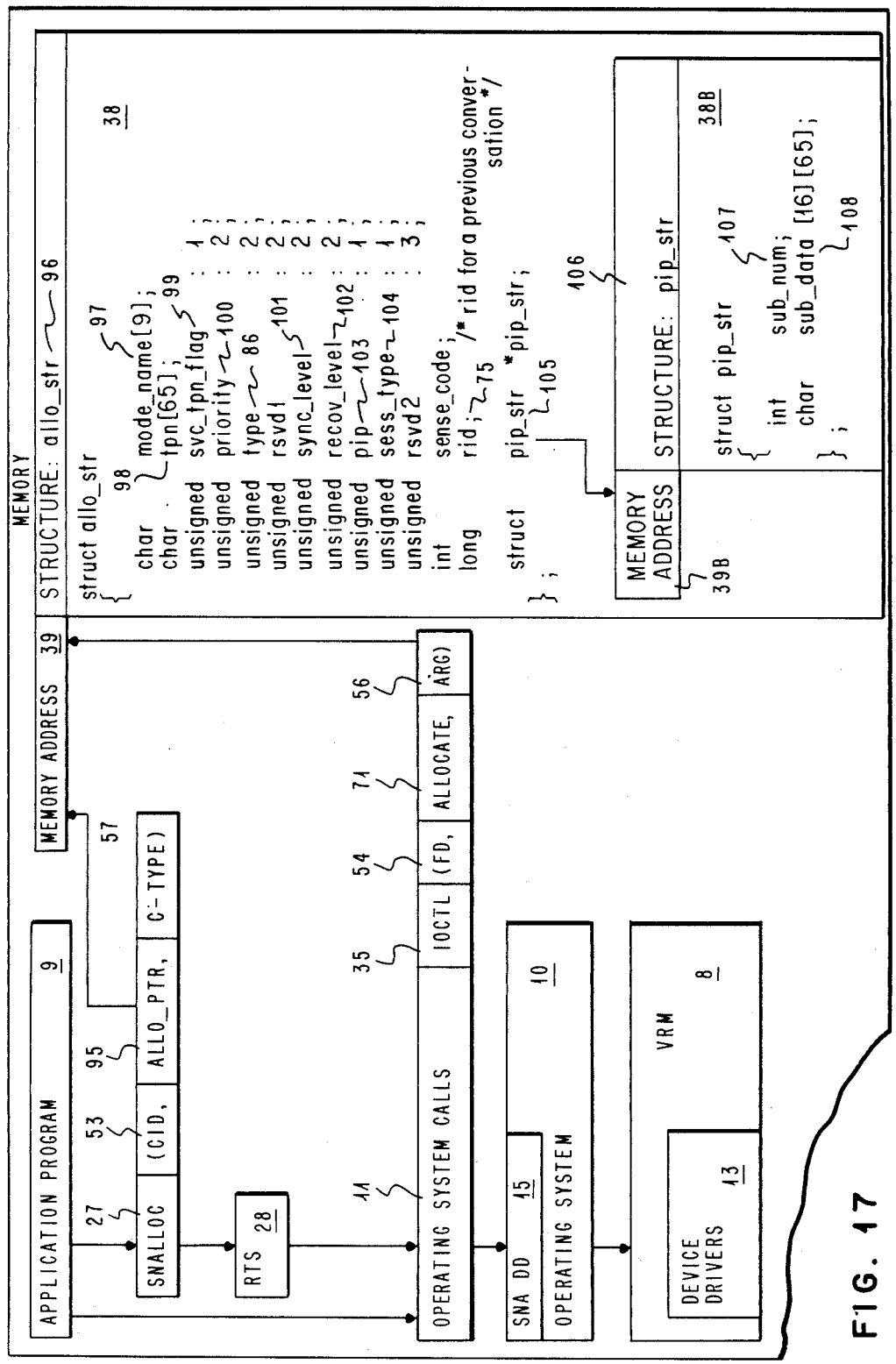
FIG. 17 shows a subroutine and a command for creating a session and conversation between two transaction programs.

Referring to FIG. 17, both the subroutine "snalloc" 27 and the ALLOCATE request 71 on the "ioctl" command 35 gets access to a session 17 (FIG. 3) and creates a conversation 16 (FIG. 3) between two transaction programs 9A, 9B (FIG. 3). First, the command 71 and subroutine 27 allocate a session 17 (FIG. 3) between the local LU (6A FIG. 3) and a remote LU (6B FIG. 3). Then, the commands allocate a conversation 16 between the local transaction program 9A and a remote transaction program 9B using the allocated session. The commands return a resource I.D. 75 (FIG. 17) to identify the conversation 16 (FIG. 3).

The subroutine "snalloc" 27 has a parameter "allo_ptr" 95 which is a pointer to a structure of type "allo_str" 96 that contains additional information for the subroutine "snalloc" 27. The "arg" parameter 56 on the "ioctl" command 35 is a pointer to the structure of type "allo_str" 96, also. The structure 96 is as shown in the memory 38. The parameter "mode_name" 97 specifies a variable that contains the mode name of the conversation 16 (FIG. 3). The mode name designates the network properties for the session to be allocated, such as the class of service to be used. The parameter "tpn" 98 is a variable that specifies the name of the remote transaction program 9B (FIG. 3) with which to establish the conversation 16 (FIG. 3). The parameter "svc_tpn_flag" 99 specifies whether the "tpn" parameter 98 specifies a service transaction program name specified in hex. The "priority" parameter 100 specifies the priority option which selects a mode profile to be used to establish an appropriate session for the conversation. The parameter "type" 86 specifies the type of conversation to be allocated. The parameter "sync_level" 101 specifies the synchronization level to be used by the program for this conversation. The parameter "recov_level" 102 specifies the recovery level that the local program uses for this conversation. The parameter "pip" 103 specifies whether the program initialization data is provided for the remote transaction program. The parameter "sess_type" 104 specifies the type of session to be allocated. The parameter "rid" 75 specifies a resource ID that was returned from a previous "snalloc" subroutine 27. The parameter "pip_ptr" 105 points to the structure 106 that contains the initialization data when the "pip" parameter 103 indicates that program initialization data for the remote program is being supplied.

The structure of type "allo_str" 96 contains a pointer 105 to an additional structure 106 of the type "pip_str" as shown in memory 38B. The parameter "subnum" 107 specifies the number of subfields used in the pip structure 106. The parameter "sub_data" 108 is the array of program initialization data for the remote program.

Figure 18:
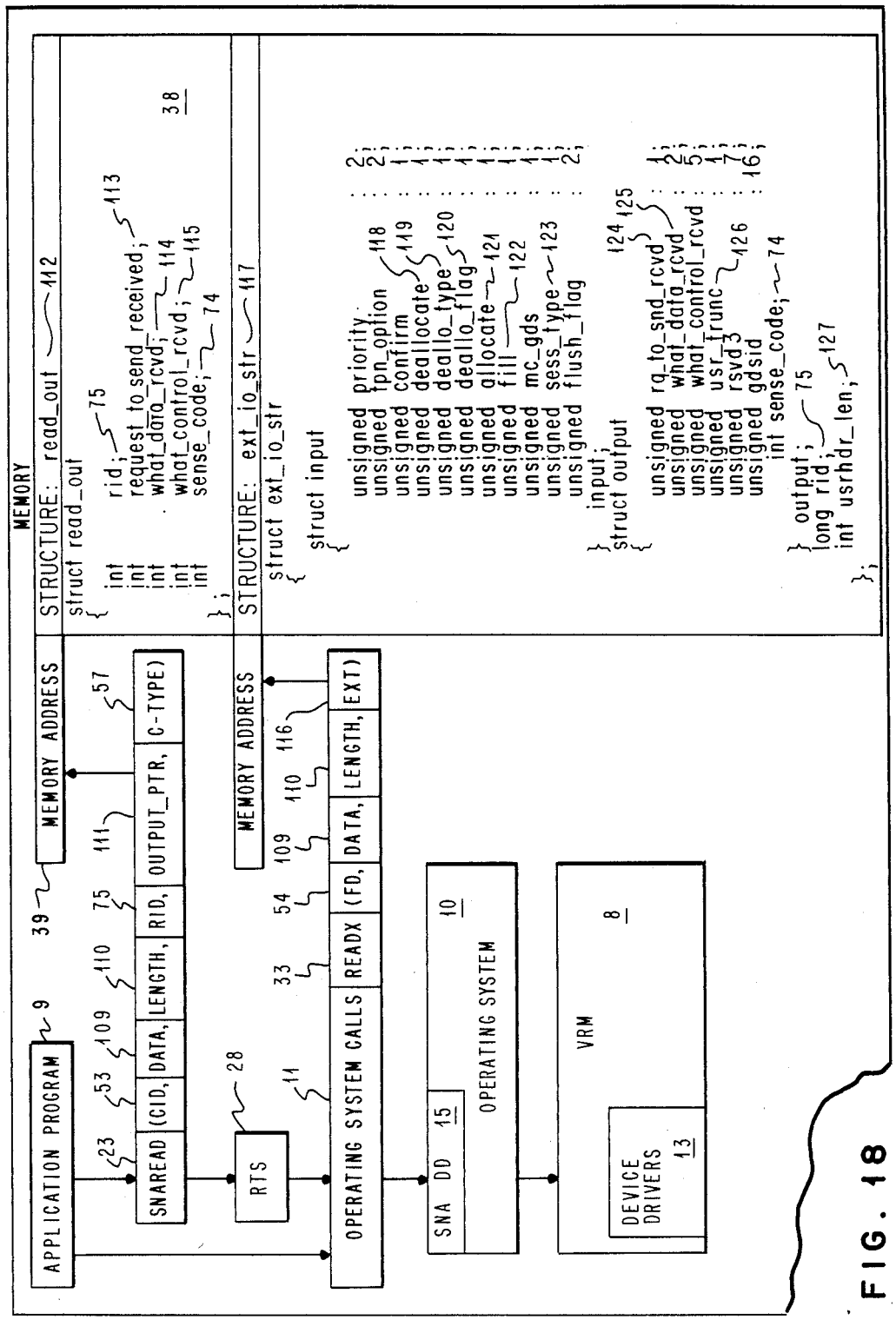
FIG. 18 shows a subroutine and command for receiving information from a conversation.
Figure 49:
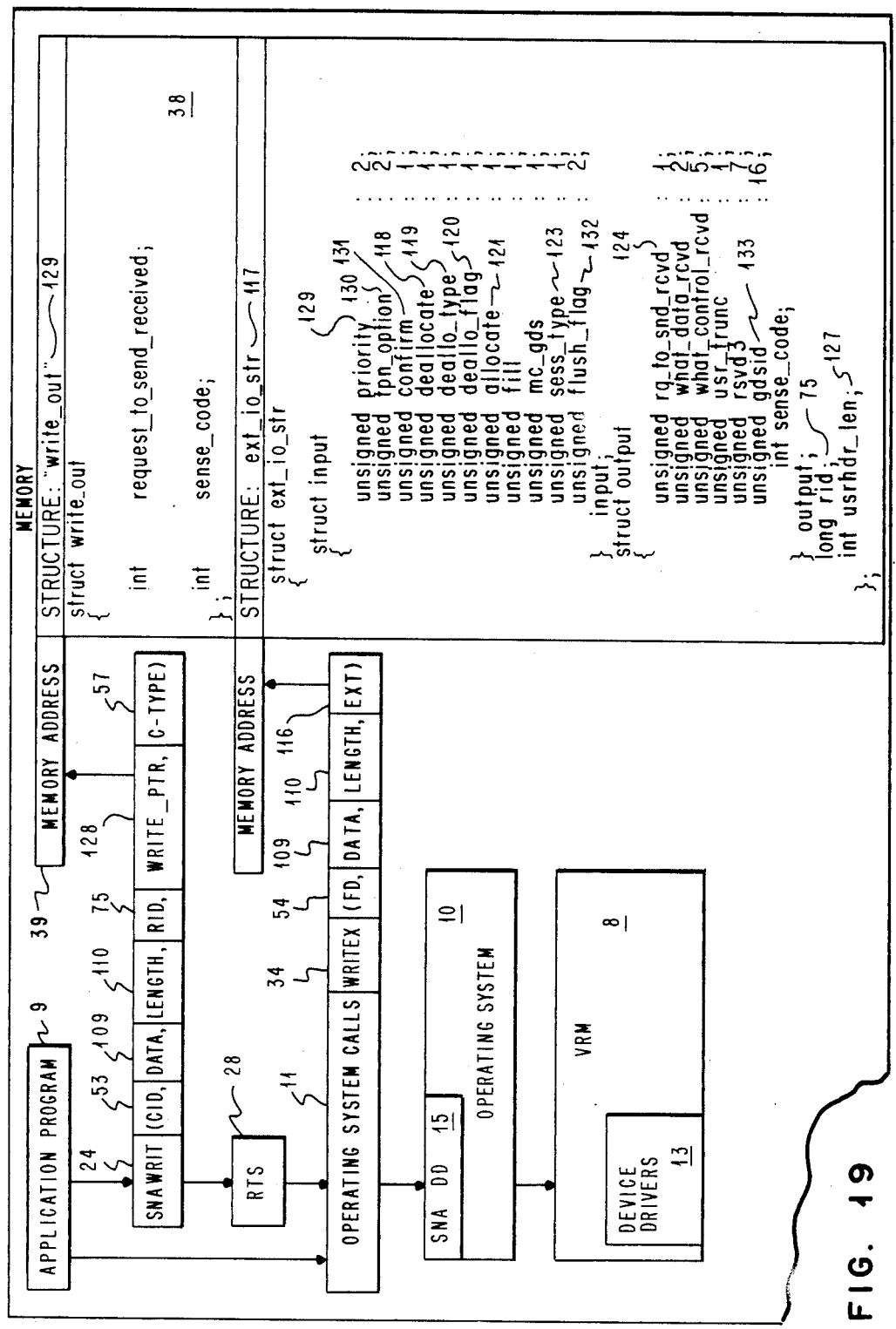

Referring to FIG. 18, the subroutine "snaread" 23 receives information from a specified conversation. The "snaread" subroutine has the parameters "cid" 53, "data" 109, "length" 110, "rid" 75, "output_ptr" 111, and "c_type" 57. The parameter "cid" 53 specifies the variable that contains the connection id returned by the "snaopen" subroutine 21. The parameter "data" 109 specifies a pointer to the buffer area 38 into which the data will be read. The parameter "length" 110 specifies the variable that contains a value indicating the maximum number of bytes of data to be received. The parameter "rid" 75 specifies the variable that contains the resource id returned by the "snalloc" subroutine 27 that allocated the resources to be read. The parameter "output_ptr" 111 specifies a pointer to a structure 112 of type "read_out" that receives the information from this subroutine 23. The parameter "c_type" 57 specifies a constant that indicates the conversation type.

The structure 112 of type "read_out" to which the parameter "output_ptr" 111 of the subroutine "snaread" 23 points, has the following parameters. The parameter "rid" 75 specifies the variable that contains the resource ID returned by the "snalloc" subroutine 27 that allocated the resource to be read. The parameter "request_to send_received" 113 specifies the variable that gets set to indicate whether a request to send has been received. The parameter "what_data_rcvd" 114 specifies the variable that gets set to indicate what type of data the program received. The parameter "what_control_received" 115 specifies the variable that is set to indicate the type of control that the program received. The parameter "sense_code" 74 specifies the variable that is set to the value of the sense code for negative responses.

Further shown in FIG. 18, the "readx" command 33 receives data from the remote transaction program 9B (FIG. 3). The "readx" command 33 waits for information to arrive on the specified conversation and then receives the information. If the information is already available, it receives the information without waiting. The information can be data, conversation status, or a request for confirmation. The "readx" command 33 has the parameters "fd" 54, "data" 109, "length" 110, and "ext" 116. The parameter "ext" 116 specifies a pointer to an extended I/O structure of type "ext_io_str" 117. The "ext_io_str" structure 117 allows the user to combine functions into one call.

The "readx" command 33 uses the following fields in the structure 117: "allocate" 121, "fill" 122, "rq_to_snd_rcvd" 124, "what_data_rcvd" 125, "usr_trunc" 126, "sense_code" 74, "rid" 75, "usrhdr_len" 127, "usr_trunc" 128, and "usrhdr" 129. The parameter "allocate" 121 specifies whether to allocate a conversation along with the "readx" command 33. The parameter "fill" 122 specifies whether the program receives data without regard to the logical record format of the data. The parameter "rq_to_snd_rcvd" 124 indicates whether a request to send has been received. The parameter "what_data_rcvd" 125 specifies the variable to be set to indicate what type of data the program received. The parameter "usrhdr_len" 127 specifies the number of bytes of header data that was received with the data.

Referring to FIG. 19, the routine "snawrit" 24 sends data to the remote transaction program. The "snawrit" command 24 comprises the parameters "cid" 53 "data" 109, "length" 110, "rid" 75, "write_ptr" 128, and "c_type" 57. The parameter "cid" 53 specifies the variable that contains the connection ID returned by the "snaopen" routine 21. The parameter "data" 109 specifies a pointer to the buffer area from which the data will be sent. The parameter "length" 110 specifies the variable that contains a value indicating the number of bytes of data to be sent. The parameter "rid" 75 specifies the variable that contains the resource ID returned by the "snalloc" routine 27. The parameter "write_ptr" 128 specifies a pointer to the "write_out" structure 129. The parameter "c_type" 57 specifies a character constant that indicates the conversation type.

The "writex" command 34 also sends data to the remote transaction program (9B FIG. 3). The "writex" command 34 comprises the parameters "fd" 54, "data" 109, "length" 110, "ext" 116. The parameter "fd" 54 specifies the variable that contains the file descriptor returned by the "open" command 31. The parameter "data" 109 specifies a pointer to the buffer area from which data will be sent. The parameter "length" 110 specifies the variable that contains a value indicating the number of bytes of data to be sent. The parameter "ext" 116 specifies a pointer to an extended I/O structure 117. The "ext_io_str" structure 117 allows the user to combine functions such as "writex" 33, allocate 71, and deallocate 72 into one call. The "writex" command 34 uses the following fields in the structure 117: "priority" 129, "tpn_option" 130, "confirm" 131, "deallocate" 118, "deallo_type" 119, "deallo_flag" 120, "allocate" 121, "sess_type" 123, "flush_flag" 132, "rq_to_snd_rcvd" 124, "gdsid" 133, "rid" 75, and "usrhdr_len" 127.

The parameter "priority" 129 specifies the priority option which selects a mode profile to be used to establish an appropriate session for the conversation. The parameter "tpn_option" 130 specifies the remote transaction program name option to be used to establish an appropriate session for the conversation. The parameter "confirm" 131 designates whether to flush the send buffer and wait for confirmation of receipt of the data from the remote application program. The field "deallocate" 118 designates whether to deallocate the conversation after transmitting the data associated with this "readx" command 33. The parameter "deallo_type" 119 specifies the type of deallocation to perform. The parameter "deallo_flag" 120 specifies whether the resource ID is discarded or retained when the conversation is deallocated. The parameter "sess_type" 123 specifies the type of session to be allocated. The parameter "flush_flag" indicates whether to perform a FLUSH request 63 (FIG. 5) in addition to the requested "writex" command 34.

Figure 20:
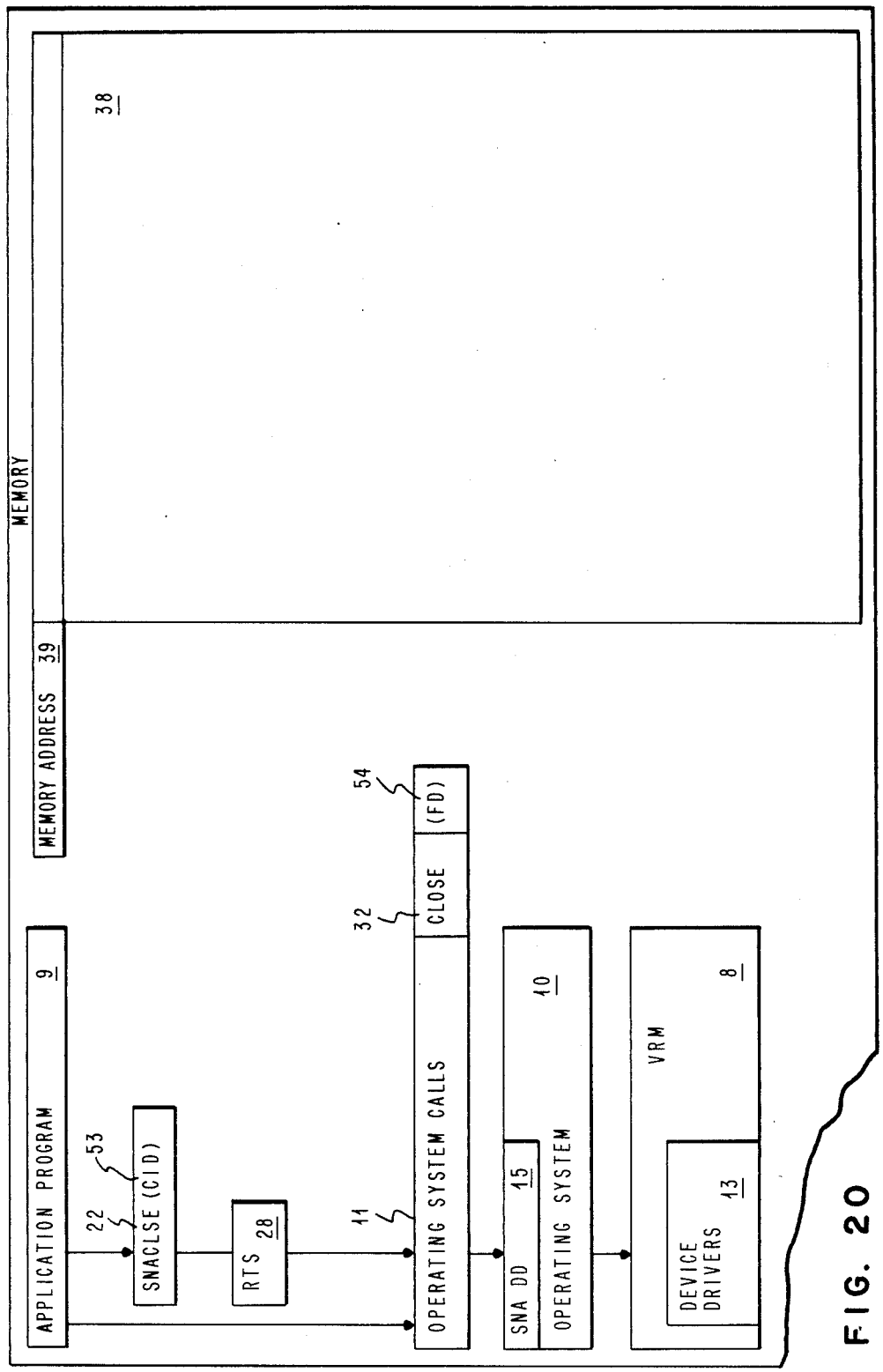
FIG. 20 shows a subroutine and a command for closing a connection.

Referring to FIG. 20, the "snaclse" subroutine 22 closes a connection specified by its connection ID through the parameter "cid" 53. The parameter "cid" 53 specifies the variable that contains the connection ID returned by the subroutine "snaopen" 21 (FIG. 4). The "close" command closes a connection specified by the file descriptor 54.

Although the foregoing invention has been particularly shown and described with reference to the preferred embodiments thereof, it will be understood by those skilled in the art that other changes in form may be made without departing from the spirit and scope of the invention. This includes, but is not limited to, the various structures shown in memory 38. Although the structures were shown in the C programming language, equivalent structures within the scope of this invention could exist in other programming languages.

We claim:

1. A method for a first processing system to communicate with a second processing system using a network architecture, said method comprising:

issuing, by an application program running on said first processing system, a first routine specifying a connection name identifying a network path from said application program to a resource in said second processing system;

issuing, by said application program, a second routine for accessing a networking function of said network architecture, said routine having at least one parameter; and specifying, in the at least one parameter of said second routine, an identifier parameter correlating to said specified connection name of said first routine.

2. A method for a first processing system to communicate with a second processing system using a network architecture, said method comprising:

issuing, by an application program running on said first processing system, a first routine specifying a connection name identifying a network path from said application program to a resource in said second processing system;

issuing, by said application program, a second routine for accessing a networking function of said network architecture, said routine having a plurality of parameters;

specifying, in a one of said plurality of parameters of said second routine, an identifier parameter correlating to said specified connection name of said first routine; and requesting a control function by said application program for the networking function in another of said parameters of said second routine.

3. The method of claim 2 further comprising the step of specifying in the routine a pointer to a structure in memory of the first processing system, said structure containing a plurality of information parameters for said requested control function.

4. A method for a first processing system to communicate with a second processing system using a network architecture, said method comprising:

issuing, by an application program running on said first processing system, a first system call specifying a connection name identifying a network path from said application program to a resource in said second processing system;

issuing, by an application program, a second system call for accessing a networking function of said network architecture, said system call having at least one parameter; and specifying, in the at least one parameter of said second system call, an identifier parameter correlating to said specified connection name of said first system call.

5. A method for a first processing system to communicate with a second processing system using a network architecture, said method comprising:

issuing, by an application program running on said first processing system, a first system call specifying a connection name identifying a network path from said application program to a resource in said second processing system;

issuing, by said application program, a second system call for accessing a networking function of said network architecture, said system call having a plurality of parameters;

specifying, in a one of said plurality of parameters of said second system call, an identifier parameter correlating to said specified connection name of said first system call; and requesting a control function by said application program for the networking function in another of said parameters in said second system call.

6. The method of claim 5 further comprising the step of specifying in the system call a pointer to a structure in memory of the first processing system, said structure containing a plurality of information parameters for said requested control function.

7. An interface to an application program for accessing a networking function comprising:

a routine accessing a networking function;

a parameter in the routine for requesting a control function of the networking function; and means, connected to said routine, for specifying a structure having a type containing a plurality of information parameters of said control function.

8. The interface of claim 7 wherein the control function asks a remote program if a last transmission was successfully received, and the structure is of type "conf_str".

9. The interface of claim 7 wherein the control function sends data in a local logical unit to a remote logical unit, and the structure is of type "flush_str".

10. The interface of claim 7 wherein the control function gets information about a specified conversation, and the structure is of type "attr_str".

11. The interface of claim 7 wherein the control function gets information about a current session, and the structure is of type "gstat_str".

12. The interface of claim 7 wherein the control function notifies a remote logical unit of a change in conversation direction to allow a local logical unit to receive from the remote logical unit, and the structure is of type "prep_str".

13. The interface of claim 7 wherein the control function informs a remote program that a local program detected an error in information received from the remote program, and the structure is of type "erro_str".

14. The interface of claim 7 wherein the control function sends an FM header to a remote logical unit, and the structure is of type "fmh_str".

15. The interface of claim 7 wherein the control function sends status information about devices on a local session to a host program, and the structure is of type "stat_str".

16. An interface to an application program for accessing a networking function comprising:

a system call accessing a networking function;

a parameter in the system call for requesting a control function of the networking function; and means, connected to said system call, for specifying a structure having a type containing a plurality of information parameters of said control function.

17. The interface of claim 16 wherein the control function asks a remote program if a last transmission was successfully received, and the structure is of type "conf_str".

18. The interface of claim 16 wherein the control function sends data in a local logical unit to a remote logical unit, and the structure is of type "flush_str".

19. The interface of claim 16 wherein the control function gets information about a specified conversation, and the structure is of type "attr_str".

20. The interface of claim 16 wherein the control function gets information about a current session, and the structure is of type "gstat_str".

21. The interface of claim 16 wherein the control function notifies a remote logical unit of a change in conversation direction to allow a local logical unit to receive from the remote logical unit, and the structure is of type "prep_str".

22. The interface of claim 16 wherein the control function informs a remote program that a local program detected an error in information received from the remote program, and the structure is of type "erro_str".

23. The interface of claim 16 wherein the control function sends an FM header to a remote logical unit, and the structure is of type "fmh_str".

24. The interface of claim 16 wherein the control function sends status information about devices on a local session to a host program, and the structure is of type "stat_str".

25. The interface of claim 16 wherein the control function dissolves a conversation, and the structure is of type "deal_str".

26. The interface of claim 16 wherein the control function creates a conversation, and the structure is of type "allo_str".

27. An interface to an application program for accessing a networking function comprising:
a routine for creating a conversation having a plurality of parameters; and
means, connected to said routine, for specifying a structure of type "allo_str" in a one of said plurality of parameters.

28. An interface to an application program for accessing a networking function comprising:
a routine for dissolving a conversation having a plurality of parameters; and
means, connected to said routine, for specifying a structure of type "deal_str" in a one of said plurality of parameters.

29. An interface to an application program for accessing a networking function comprising:
a routine for receiving data having a plurality of parameters; and
means, connected to said routine, for specifying a structure of type "read_out" in a one of said plurality of parameters.

30. An interface to an application program for accessing a networking function comprising:
a routine for sending data having a plurality of parameters; and
means, connected to said routine, for specifying a structure of type "write_out" in a one of said plurality of parameters.

31. An interface to an application program for accessing a networking function comprising:
a system call for receiving data having a plurality of parameters; and
means, connected to said system call, for specifying a structure of type "ext_io_str" in a one of said plurality of parameters.

32. An interface to an application program for accessing a networking function comprising:
a system call for sending data having a plurality of parameters; and
means, connected to said system call, for specifying a structure of type "ext_io_str" in a one of said plurality of parameters.

33. An interface to an application program comprising:
an input/output control system call for transferring operations between a local transaction program and a remote transaction program; and
means, connected to said input/output control system call, for specifying a plurality of control functions of said transferred operations with said system call.

34. The interface of claim 33 wherein said plurality of control functions comprise asking the remote transaction program whether a last transmission was successfully received, confirming said last transmission was successfully received, and notifying a remote resource of a changed conversation direction for sending and receiving data.

* * * * *